United States Patent [19]

Inoue et al.

[11] Patent Number: 5,788,385
[45] Date of Patent: Aug. 4, 1998

[54] SERIAL RECORDING SYSTEM CAPABLE OF VARING RESOLUTION

[75] Inventors: Naoshi Inoue, Tokyo; Kiyoharu Yoshioka, Yokohama; Hiroyuki Kuriyama, Kawasaki; Soji Hamano, Yokohama; Akihiko Hamamoto, Kawasaki; Makoto Hinohara; Osamu Yamada, both of Tokyo, all of Japan

[73] Assignee: Canon Kabushiki Kaisha, Tokyo, Japan

[21] Appl. No.: 901,956

[22] Filed: Jul. 29, 1997

Related U.S. Application Data

[63] Continuation of Ser. No. 427,723, Apr. 24, 1995, abandoned, which is a continuation of Ser. No. 947,299, Sep. 18, 1992, abandoned.

[30] Foreign Application Priority Data

| Sep. 19, 1991 | [JP] | Japan | 3-239988 |
| Sep. 30, 1991 | [JP] | Japan | 3-252216 |
| Oct. 11, 1991 | [JP] | Japan | 3-263641 |
| Oct. 11, 1991 | [JP] | Japan | 3-263642 |
| Feb. 12, 1992 | [JP] | Japan | 4-025060 |

[51] Int. Cl.$^6$ ............................................. B41J 19/00
[52] U.S. Cl. ............................................. 400/279; 400/320
[58] Field of Search ............................ 400/124.04, 279, 400/320, 322

[56] References Cited

U.S. PATENT DOCUMENTS

| 4,024,447 | 5/1977 | Epstein | 400/120 |
| 4,024,941 | 5/1977 | Sekikawa et al. | 400/903 |
| 4,030,587 | 5/1977 | Walker | 400/120 |
| 4,113,391 | 9/1978 | Minowa | 400/120 |
| 4,213,714 | 7/1980 | Jones et al. | 400/322 |
| 4,247,214 | 1/1981 | Swan | 400/120 |
| 4,278,359 | 7/1981 | Weikel | 400/303 |
| 4,549,222 | 10/1985 | Fogaroli et al. | 358/296 |
| 4,669,897 | 6/1987 | Asakura et al. | 400/121 |
| 5,045,869 | 9/1991 | Isaka et al. | 346/108 |

FOREIGN PATENT DOCUMENTS

| 54-137241 | 10/1979 | Japan | 400/320 |
| 55-113585 | 9/1980 | Japan | 400/320 |
| 67275 | 6/1981 | Japan | 400/320 |
| 183163 | 9/1985 | Japan | 400/303 |
| 61-094769 | 5/1986 | Japan | 400/279 |
| 61-270163 | 11/1986 | Japan | 400/279 |
| 62-198468 | 9/1987 | Japan | 400/120 |
| 62-236774 | 10/1987 | Japan | 400/279 |
| 1297566 | 2/1970 | United Kingdom | 400/320 |

OTHER PUBLICATIONS

Eur. Pat. Off. Search Report for Eur. Pat. App. No. 92308516.1.

*Primary Examiner*—John S. Hilten
*Assistant Examiner*—Steven S. Kelley
*Attorney, Agent, or Firm*—Fitzpatrick, Cella, Harper & Scinto

[57] ABSTRACT

A recording apparatus for recording an image on a recording medium by scanning a recording head, includes a scan unit for scanning the recording head by changing the scan speed of the recording head, and a control unit for controlling the scan unit to change the scan speed of the recording head according to the resolution of image data to be recorded by the recording head so as to perform recording. A recording controller for controlling the recording apparatus is also disclosed.

54 Claims, 34 Drawing Sheets

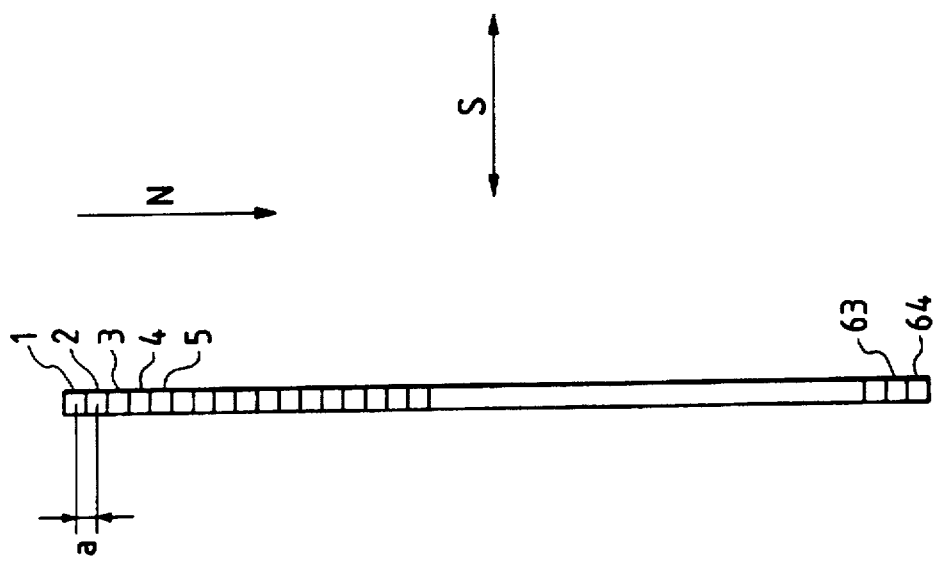
FIG. 5
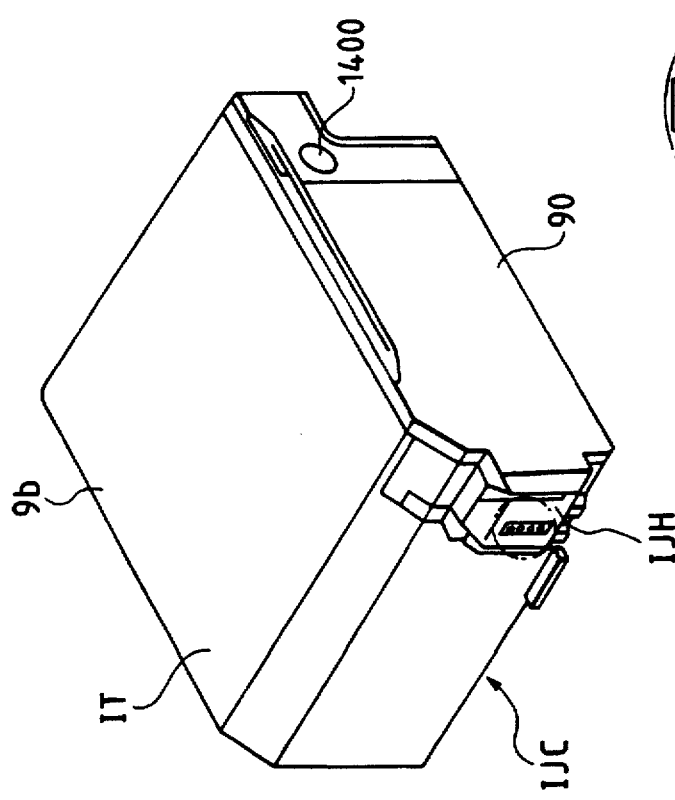
FIG. 4A
FIG. 4B

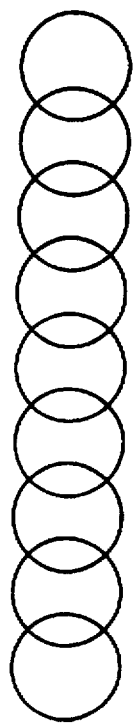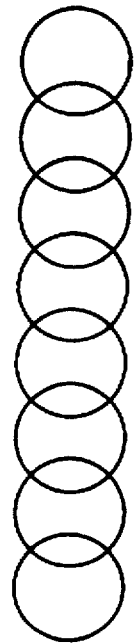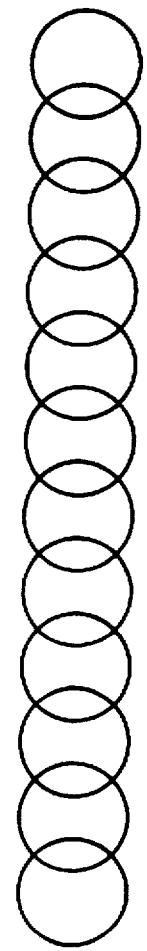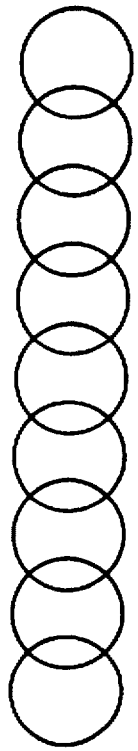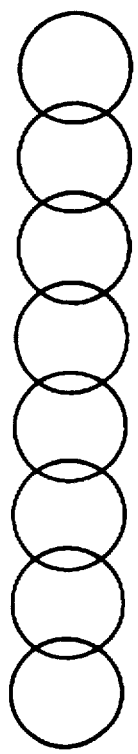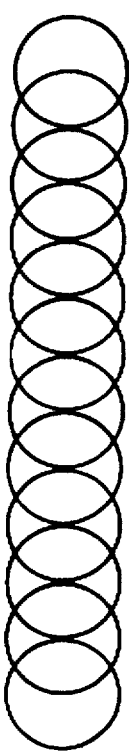
FIG. 7(a) (PRIOR ART)
FIG. 7(b) (PRIOR ART)
FIG. 7(c) (PRIOR ART)
FIG. 8(a) (PRIOR ART)
FIG. 8(b) (PRIOR ART)
FIG. 8(c) (PRIOR ART)

0.07 mm 0.1 mm 0.05 mm

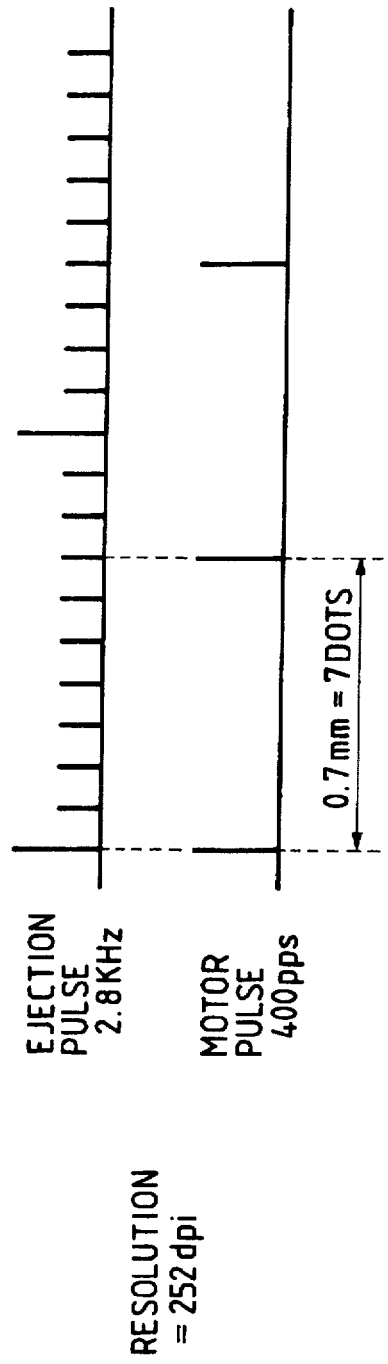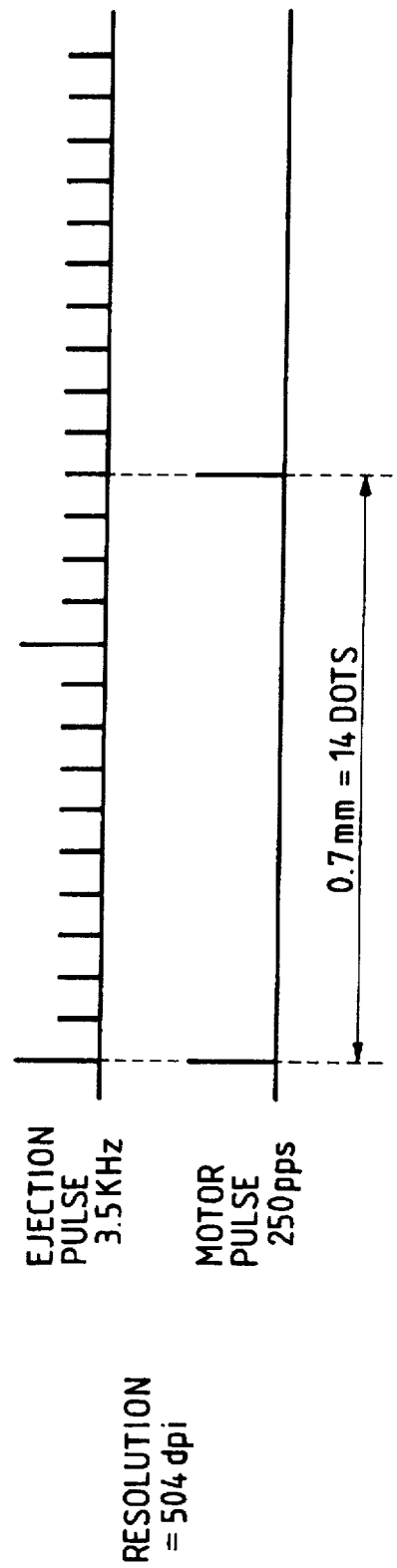
FIG. 12A
FIG. 12B

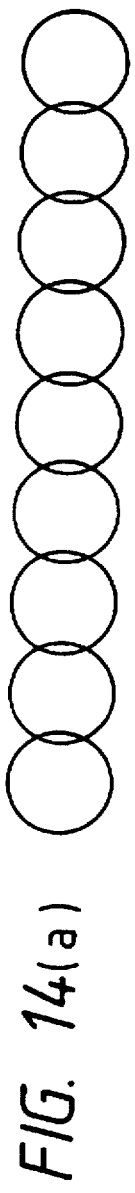
FIG. 14(a)
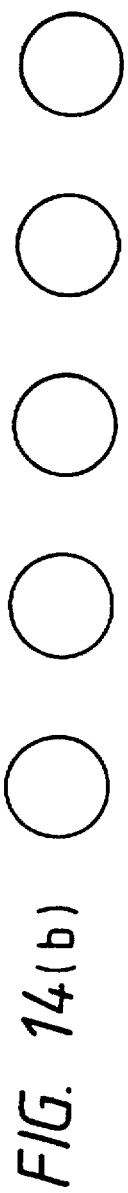
FIG. 14(b)
FIG. 15(a) EJECTION PULSE 3 KHz
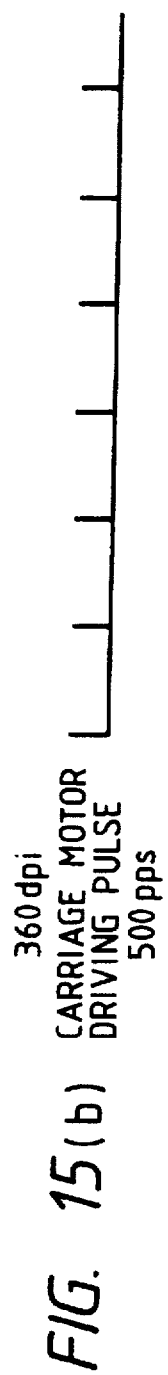
FIG. 15(b) 360 dpi CARRIAGE MOTOR DRIVING PULSE 500 pps
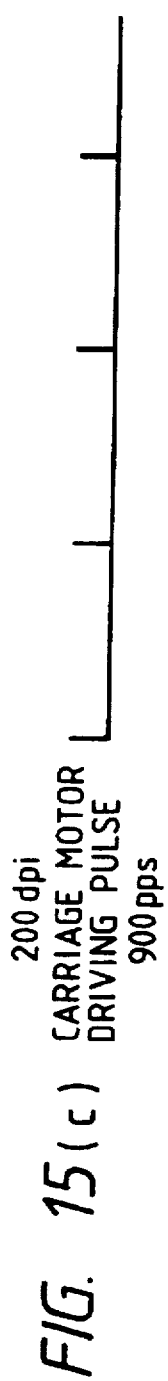
FIG. 15(c) 200 dpi CARRIAGE MOTOR DRIVING PULSE 900 pps 1S = 0.42 mm

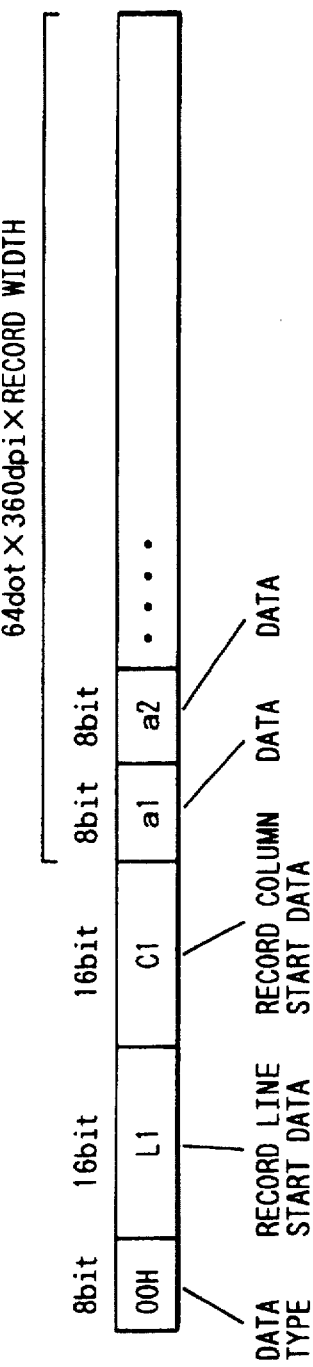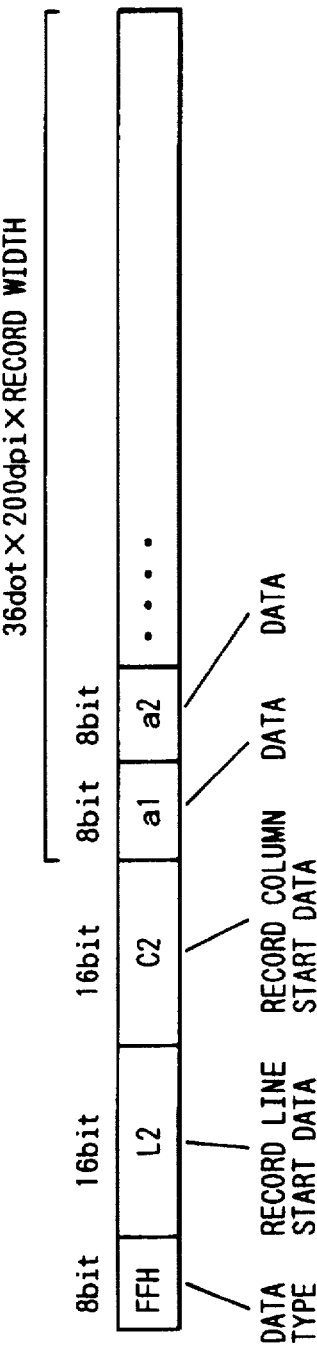
FIG. 19(a)
FIG. 19(b)

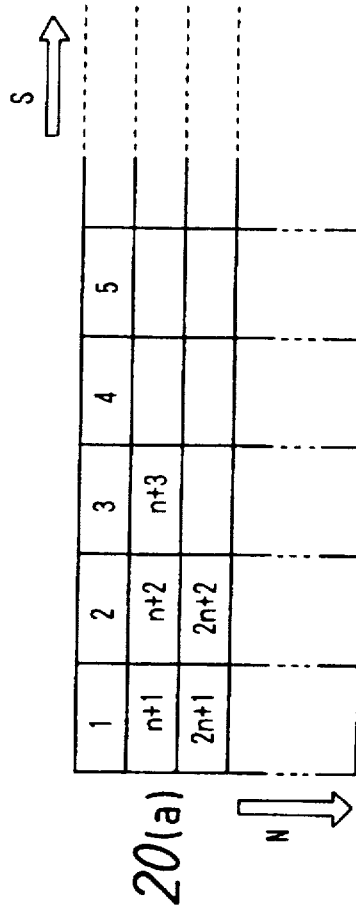
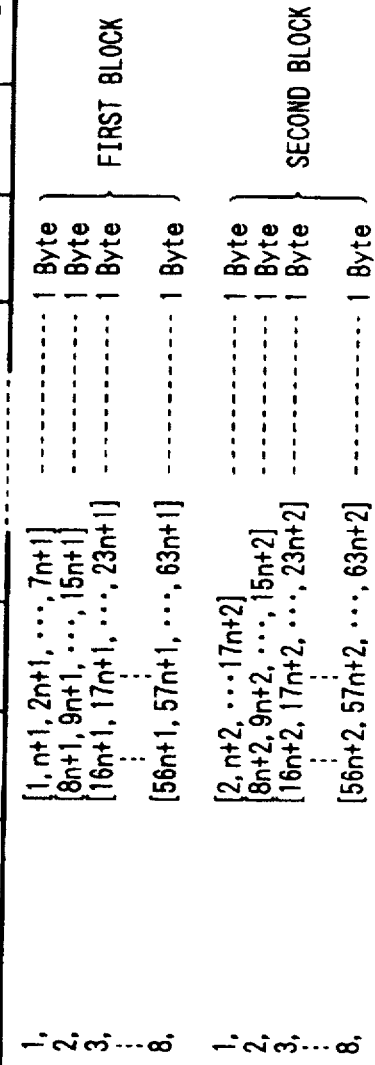
FIG. 20(a)
FIG. 20(b)

200 dpi 360 dpi

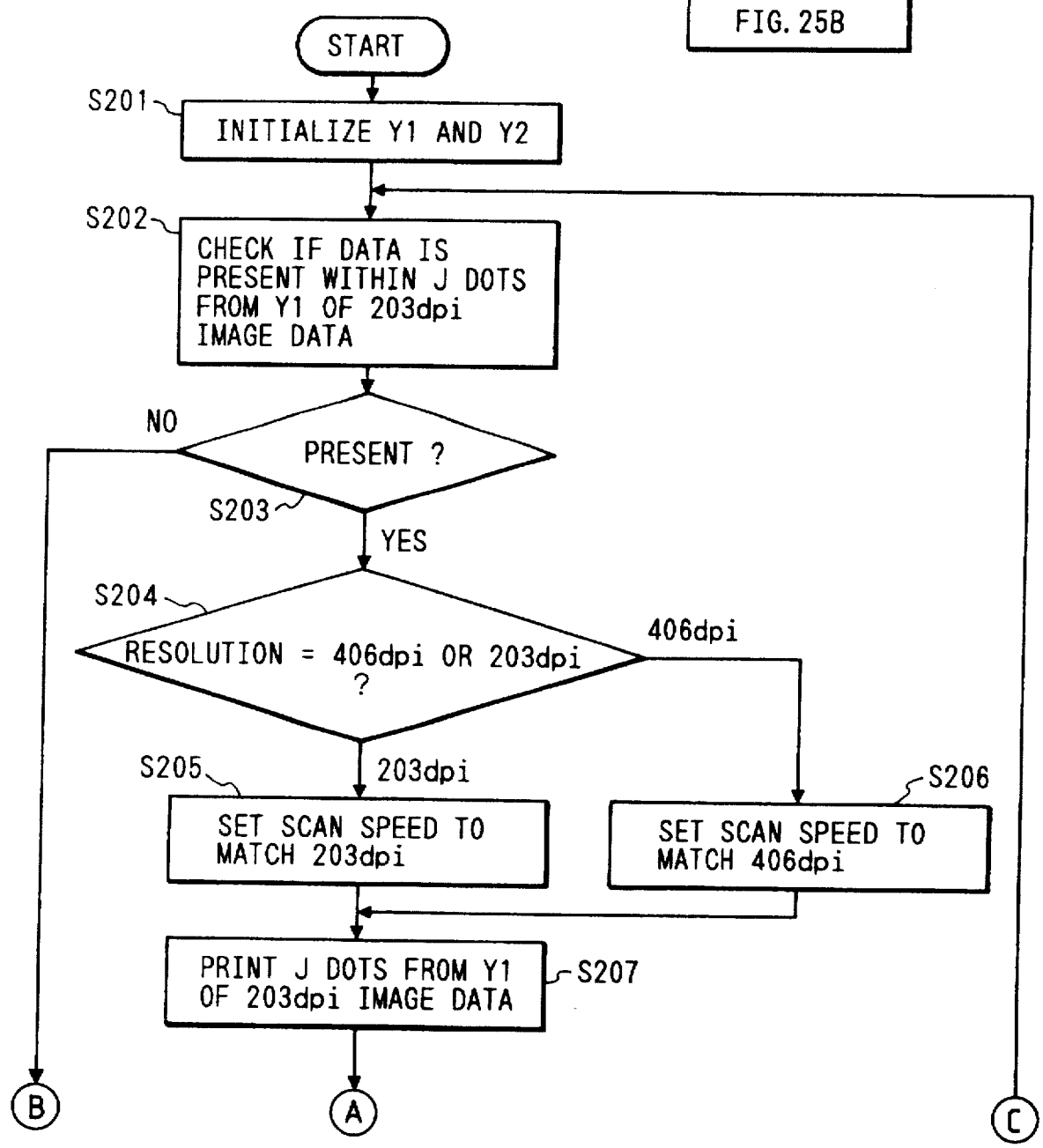

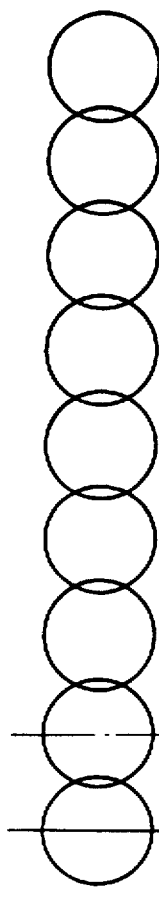
FIG. 26(a)
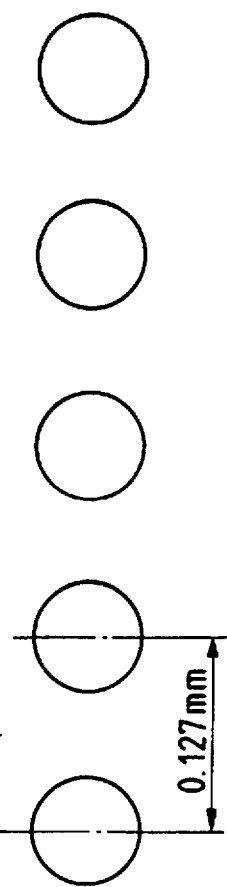
FIG. 26(b)
FIG. 27(a) EJECTION PULSE 3KHz
360dpi
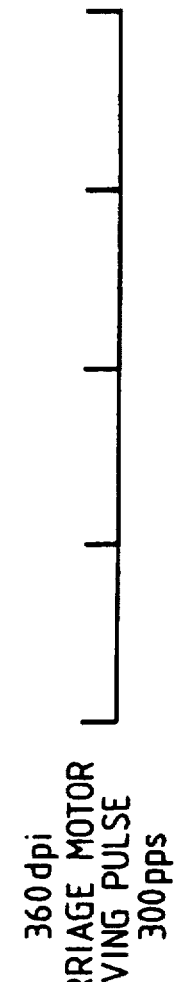
FIG. 27(b) CARRIAGE MOTOR DRIVING PULSE 300pps
200dpi
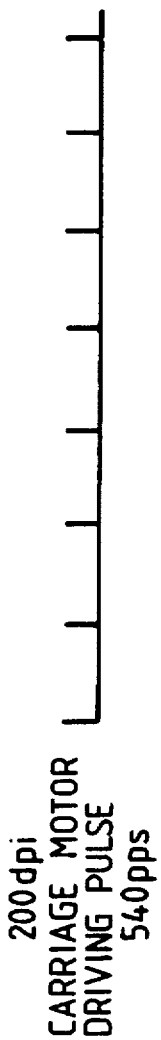
FIG. 27(c) CARRIAGE MOTOR DRIVING PULSE 540pps

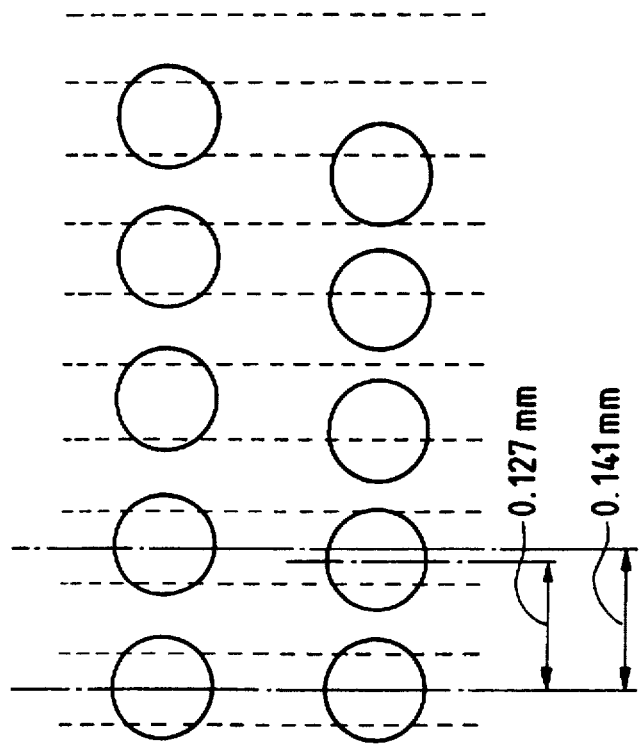
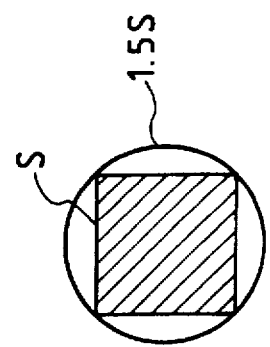
FIG. 30(a) 360 dpi
FIG. 30(b) 400 dpi
FIG. 30(c)

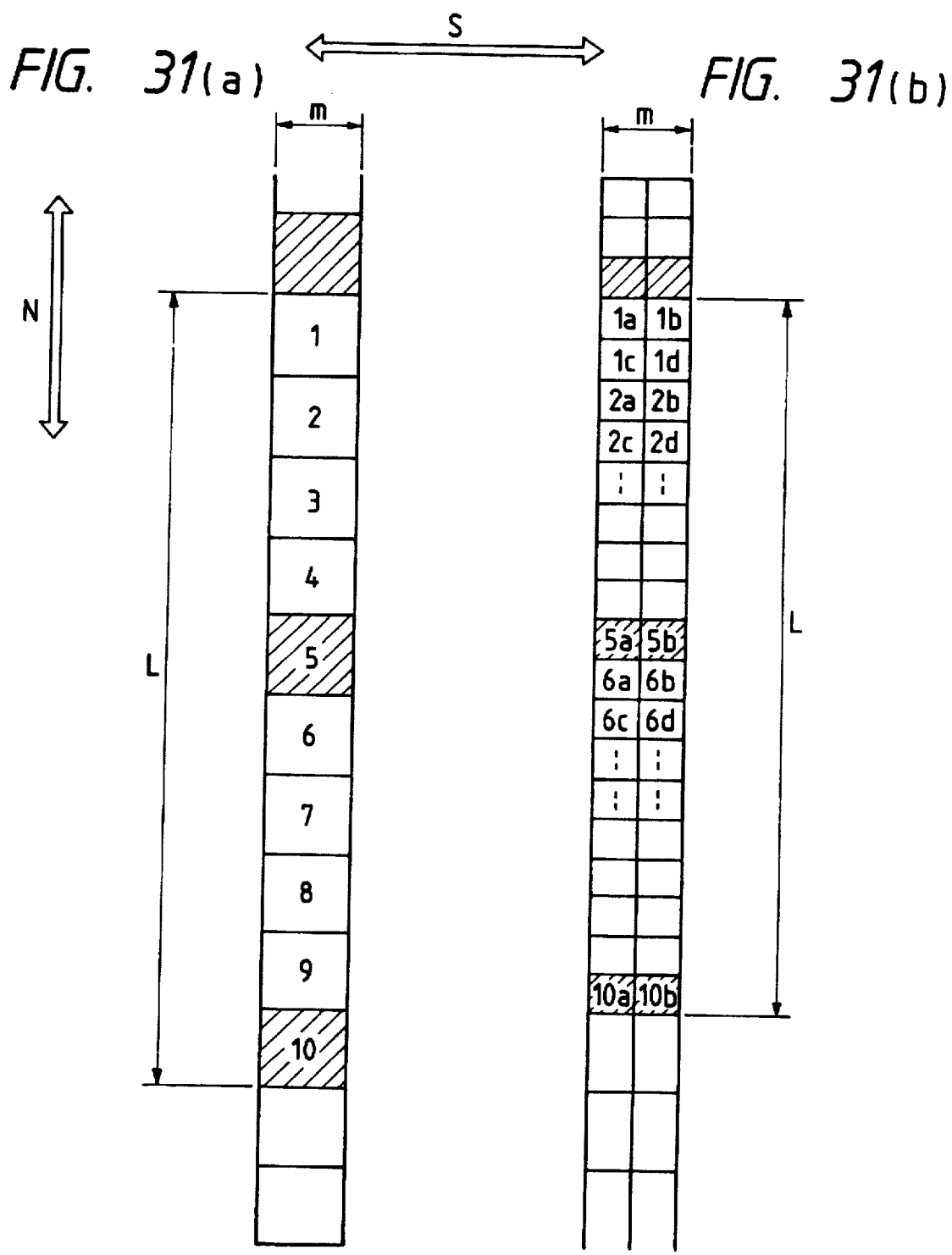

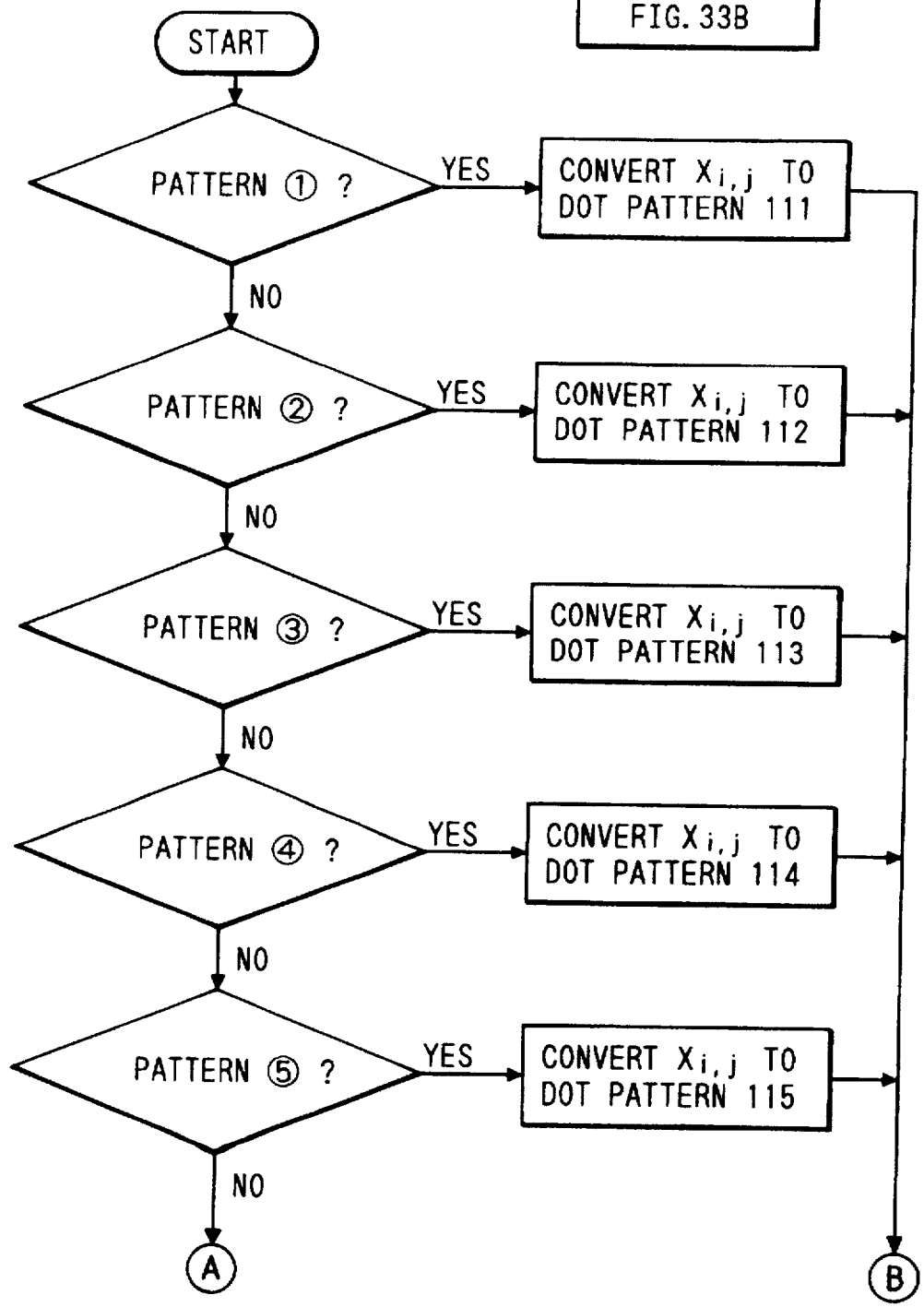
FIG. 33A
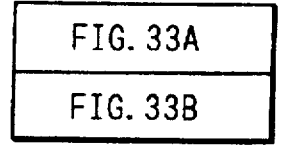

FIG. 34(a)
| $x_{i-1,j-1}$ | $x_{i,j-1}$ | $x_{i+1,j-1}$ |
|---|---|---|
| $x_{i-1,j}$ | $x_{i,j}$ | $x_{i+1,j}$ |
| $x_{i-1,j+1}$ | $x_{i,j+1}$ | $x_{i+1,j+1}$ |
FIG. 34(b)
| $x_{ij1}$ | $x_{ij2}$ |
|---|---|
| $x_{ij3}$ | $x_{ij4}$ |
FIG. 34(c)
| $x_{ij1}$ | $x_{ij2}$ |
① 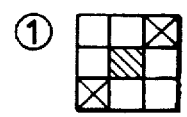  111 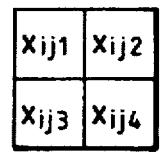  111 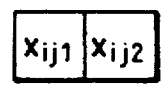
② 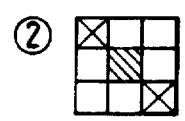  112   112 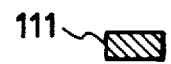
③ 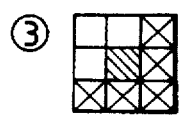  113 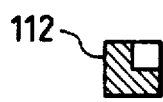  113 
④ 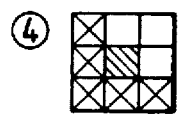  114   114 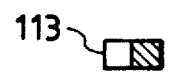
⑤ 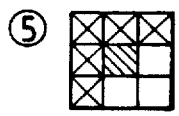  115 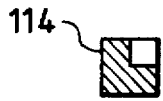  115 
⑥ 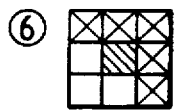  116   116 
⑦ 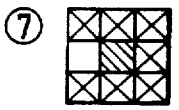  117 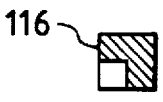  117 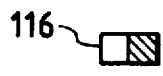
⑧ 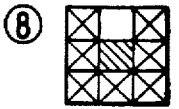  118   118 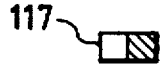
1-4 CONVERTED PATTERN     1-2 CONVERTED PATTERN 200 dpi 400 × 360 dpi

SERIAL RECORDING SYSTEM CAPABLE OF VARING RESOLUTION

This application is a continuation of application Ser. No. 08/427,723, filed Apr. 24, 1995, which was a continuation of application Ser. No. 07/947,299, filed Sep. 18, 1992, both now abandoned.

BACKGROUND OF THE INVENTION

1. Field of the Invention

The present invention relates to a recording apparatus for recording an image on a recording medium by scanning a recording head and a recording control apparatus for controlling the recording apparatus.

2. Related Background Art

In recent years, ink jet printers, which record characters or images by ejecting ink droplets from ejection orifices toward a recording medium using bubbles generated by heat energy, have been developed. In a printer of this type, since the size of a heating resistor (heater) arranged in each ejection orifice is remarkably smaller than that of a piezoelectric element used in a conventional ink jet printer, the ejection orifices can be arranged at a high density, as shown in, e.g., FIG. 4, so as to realize a multi-nozzle structure. Thus, a high-quality image can be recorded with a high resolution, and high-speed, low-noise recording can also be realized.

In a printer having such a recording head, the interval between dots recorded in the subscan direction of the recording head is designed to coincide with the dot pitch in the main scan direction of the printer head, and recording is performed by scanning the recording head in the main scan direction.

On the other hand, when image data received from a personal computer is to be printed, the received image data have various resolutions. For this reason, when the image data having various resolutions are output by a single printer, if the resolution of the received image data is different from that of the printer, the image data must be subjected to interpolation processing or thinning processing to convert the resolution of the image data so as to match it with the resolution of the printer.

In a system utilizing such an ink jet printer (e.g., a system having a printing (recording) density of 360 dpi), there is a case in which document information created by, e.g., a wordprocessor is printed at that resolution, and a facsimile received image (200 dpi) is to be inserted (superimposed) in the document. In this case, since these images having different resolutions cannot be printed in a single line, interpolation processing or thinning processing must be performed. More specifically, so-called resolution conversion processing for converting images having different resolutions to those having the same resolution (in this case, 360 dpi), and recording the converted images is required.

FIGS. 37A to 37C show conventional resolution conversion processing of image data. FIGS. 37A and 37B show a state wherein one-dimensionally aligned 200-dpi image data is converted into 360-dpi image data. For the sake of simplicity, converted data is also one-dimensionally illustrated.

In order to convert 200-dpi image data into 360-dpi image data, processing for thinning out image data to 9/10, and thereafter, doubling the thinned-out image data (FIG. 37A) is known. More specifically, the 10th pixel of the 1st to 10th dots (pixels) is thinned out, and the remaining pixels are doubled. Alternatively, processing for doubling four out of five pixels, and leaving the remaining one pixel unconverted (FIG. 37B) is also known. That is, the 1st to 4th pixels and 6th to 9th pixels are doubled, and the 5th and 10th pixels are left unchanged. In the processing shown in FIG. 37A, thinning and interpolation operations are executed. In the processing shown in FIG. 37B, an interpolation operation is executed. However, in either processing, image information is omitted or an image is distorted, and conversion cannot be faithfully performed.

FIG. 37C shows a 360-dpi image 161 obtained by converting a 200-dpi image 160 by the method shown in FIG. 37B. Not only an image is distorted, as indicated by portions (i) to (iv) of the image 161, but also a change in dimension occurs, as indicated by a portion (v). In the processing shown in FIG. 37A, although the change in dimension like in the portion (v) in FIG. 37C is difficult to occur, an image is distorted inevitably.

In addition, an image includes many zigzag patterns like portions (iv) (as if it were recorded at the resolution of 200 dpi) despite it is recorded at the resolution of 360 dpi.

In this manner, in the prior art, when image data having a resolution different from the resolution of the recording head (i.e., the printer) is to be output, some processing operations, i.e., interpolation processing, thinning processing, and the like of the image data must be performed in place of outputting original image directly. With these processing operations, generation of an unexpected stripe pattern, image nonuniformity, image distortion, omission of image data, and the like, which are not included in original image data, occur, and the original image data cannot be accurately reproduced and output.

When a facsimile received image having a resolution of 200 dpi is mixed in a single line of document data having a resolution of 360 dpi, since data having different resolutions cannot be recorded in the single line, image data must be subjected to interpolation or thinning processing. As a result, omission of image data or image distortion occurs.

SUMMARY OF THE INVENTION

It is an object of the present invention to provide a recording apparatus which can record image data having a resolution different from the resolution of the recording apparatus with high quality.

It is another object of the present invention to provide a recording apparatus which can prevent an image from being omitted or distorted at least in the scan moving direction of a recording head even when images having different resolutions are recorded.

It is still another object of the present invention to provide a recording apparatus which can increase the overall recording speed.

It is still another object of the present invention to provide a printer controller which can eliminate an image distortion and a zigzag pattern generated in an oblique line portion of an image.

In order to achieve the above objects, according to the present invention, there is provided a recording apparatus for recording an image on a recording medium by scanning a recording head, comprising scan means for scanning the recording head by changing a scan speed of the recording head, and control means for controlling the scan means to change the scan speed of the recording head according to a resolution of image data to be recorded by the recording head so as to perform recording.

In order to achieve the above objects, according to the present invention, there is also provided a recording apparatus for recording an image on a recording medium by scanning a recording head, comprising recording means for performing recording by changing a driving frequency of the recording head, and control means for controlling the recording means to change the driving frequency of the recording head according to a resolution of image data to be recorded by the recording head so as to perform recording.

Furthermore, in order to achieve the above objects, according to the present invention, there is provided a recording apparatus for receiving recording data, and recording an image based on the recording data on a recording medium by scanning a recording head, comprising pitch changing means for changing a recording pitch in a scan direction of the recording head by changing a frequency for driving the recording head on the basis of the recording data, discrimination means for discriminating a resolution switching position in image data to be recorded by a single scan operation of the recording head, and control means for controlling the pitch changing means according to the discrimination result of the discrimination means.

Moreover, in order to achieve the above objects, according to the present invention, there is provided a recording method for recording an image on a recording medium on the basis of image data by scanning a recording head, comprising the steps of: discriminating a resolution of the image data to be recorded by the recording head; scanning the recording head at a scan speed according to the discriminated resolution; and driving the recording head upon scanning of the recording head, thereby performing recording at the discriminated resolution.

In addition, in order to achieve the above objects, according to the present invention, there is provided a recording method for recording an image on a recording medium on the basis of image data by scanning a recording head, comprising the steps of: discriminating a resolution of the image data to be recorded by the recording head; scanning the recording head; and driving the recording head at a driving frequency according to the discriminated resolution upon scanning of the recording head, thereby performing recording at the resolution.

BRIEF DESCRIPTION OF THE DRAWINGS

FIG. 4 is a perspective view showing the shape of an ink cartridge of an ink jet printer;

FIG. 5 is a view showing an arrangement of ink nozzles in the ink cartridge;

FIGS. 7(a) to 7(c) are views showing image data having different resolutions recorded by a conventional ink jet printer;

FIGS. 8(a) to 8(c) are views showing image data having different resolutions recorded by the ink jet printer controlled according to the first embodiment;

FIGS. 12A and 12B are charts showing the relationship between the ink ejection pulses and the head driving pulses in the printer of the first embodiment;

FIGS. 14(a) and 14(b) are views showing the relationship among recorded points upon execution of recording at resolutions of 360 dpi and 200 dpi in the subscan direction in the second embodiment;

FIG. 15 is a chart showing the relationship between the scan speed of a recording head and the ejection period in the second embodiment;

FIGS. 19(a) and 19(b) are views showing the data formats of recording data in the second embodiment;

FIGS. 20(a) and 20(b) are views showing vertical-horizontal conversion of recording data in the second embodiment;

FIGS. 26(a) and 26(b) are views showing the relationship among recorded dots upon execution of recording at resolutions of 360 dpi and 200 dpi in the subscan direction;

FIG. 27 is a chart showing the relationship between the scan speed of the recording head and ink ejection;

FIGS. 30(a) to 30(c) are views for explaining the relationship among dots recorded at resolutions of 360 dpi and 400 dpi, and a dot shape;

FIGS. 31(a) and 31(b) are views for explaining a conversion method upon conversion of the resolutions of recording data;

FIGS. 34(A) to 34(C) show patterns for determining an arrangement of recording dots in the correction unit shown in FIG. 32;

DESCRIPTION OF THE PREFERRED EMBODIMENTS

The preferred embodiments of the present invention will be described below with reference to the accompanying drawings.

As will be apparent from the following description, a recording head of this embodiment comprises a plurality of nozzles in the vertical direction, and a two-dimensional image is recorded by scan-moving the head in a direction perpendicular to the vertical direction. In this case, the aligning direction (the above-mentioned vertical direction) of the nozzles constituting the head will be referred to as a main scan direction hereinafter, and the moving direction of the head will be referred to as a subscan direction hereinafter.

Figure 2:
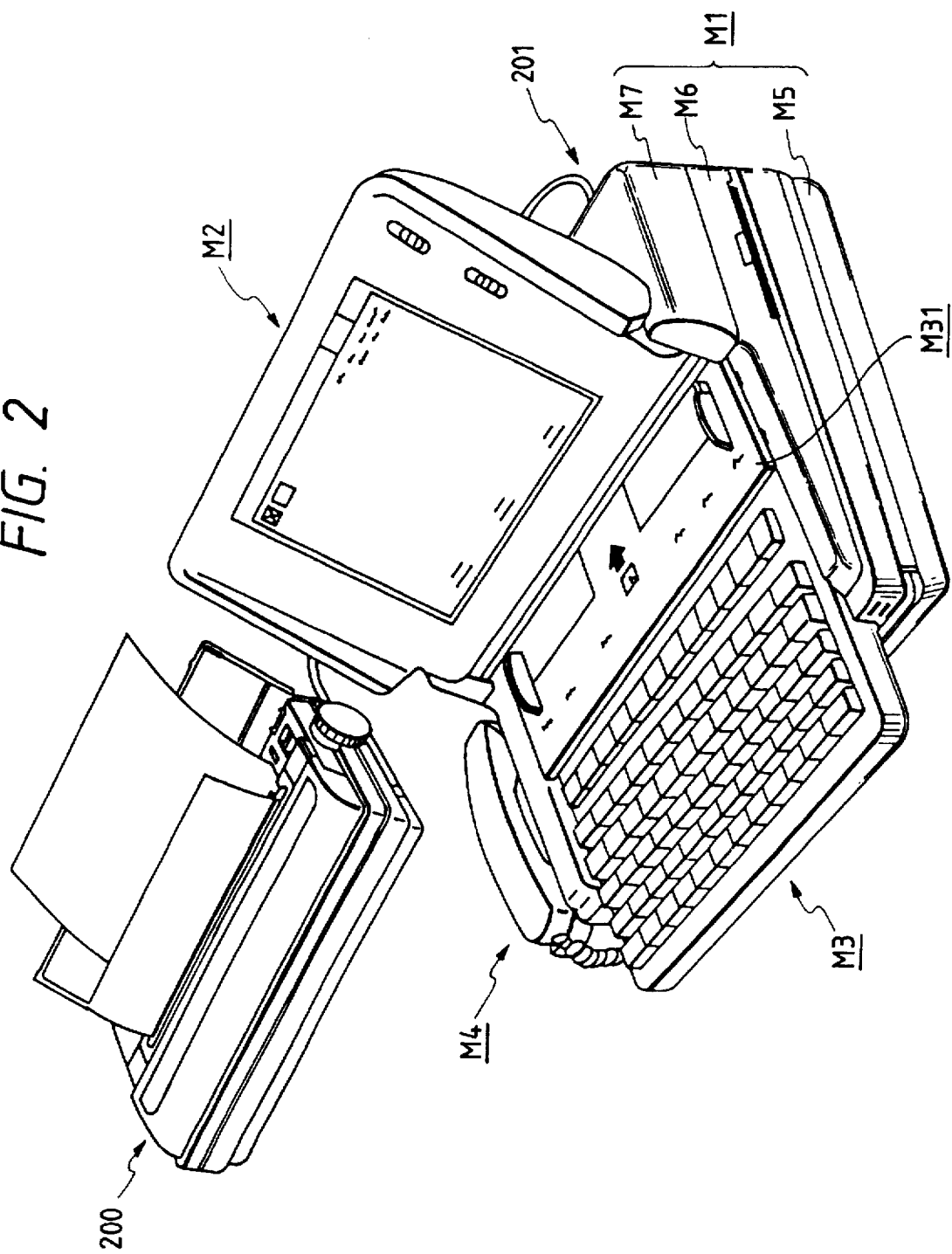
FIG. 2 is a perspective view showing the outer appearance of a system using an apparatus according to the embodiment of the present invention.

FIG. 2 is a perspective view showing a system using an apparatus according to this embodiment. A printer 200 is connected to a main unit 201 of this embodiment through an interface cable, and performs a printing operation on the basis of signals from the main unit 201. The main unit 201 basically comprises a main body unit M1, a display unit M2, a keyboard M3, and a handset unit M4.

The main body unit M1 is constituted by a bottom cover M5, a main body cover M6, and a top cover M7. A control circuit such as a CPU board, an external interface, a floppy disk drive, a hard disk drive, a loudspeaker, and the like are arranged in the main body unit M1. An original reading means (to be referred to as a scanner hereinafter) as an optional device can be arranged at the far side (FIG. 2) of the main body unit M1.

In the above-mentioned system arrangement, the printer 200 can print out a facsimile received image, a wordprocessor document, a received image in a computer communication (computer received image), and the like. The resolution of this printer 200 is 360 dpi (dots per inch)×360 dpi. The printer can record characters in the wordprocessor document with high resolution, i.e., by 48 dots×48 dots at a character size (10.5 points). The resolution of the facsimile received image is 200 dpi×200 dpi, and the computer received images have various resolutions. High-quality recording can be realized under the recording control of the printer according to this embodiment.

Figure 3:
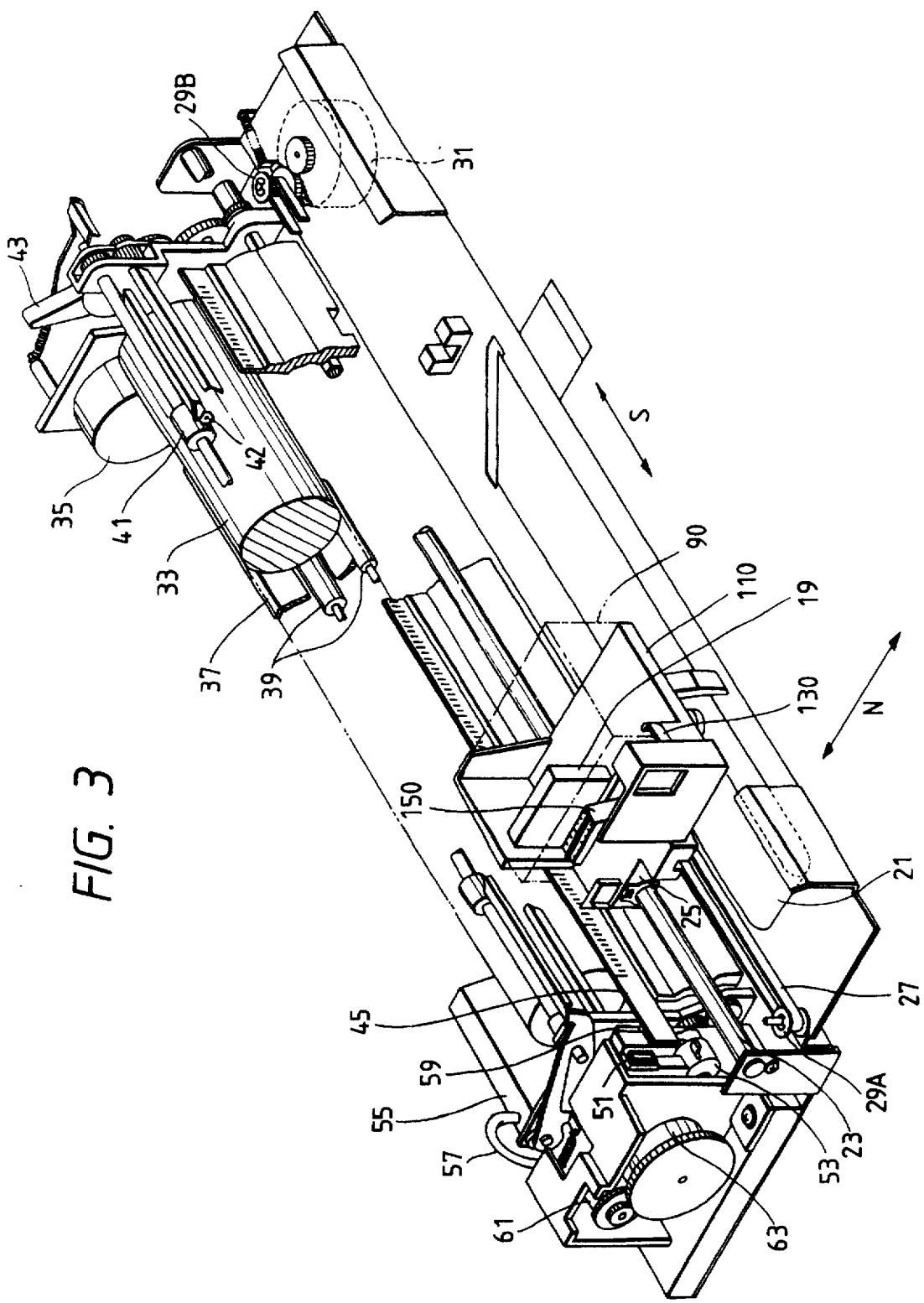
FIG. 3 is an exploded perspective view of a recording unit of a printer of the first embodiment.

FIG. 3 is a perspective view showing the internal arrangement of the printer 200 shown in FIG. 2.

In FIG. 3, a head cartridge 90 has an ink jet recording head (to be described in detail later with reference to FIG. 4). A carriage 110 mounts the head cartridge 90, and scans it in the subscan direction (S-direction) in FIG. 3. The head cartridge 90 is attached to the carriage 110 through a hook 130, which is operated by a lever 150. A support plate 19 supports an electrical connection portion for the head cartridge 90. The electrical connection portion is connected to a main body control unit through a flexible cable 21.

A guide shaft 23 for guiding the carriage 110 in the S-direction is inserted in a bearing 25 of the carriage 110. The carriage 110 is fixed on a timing belt 27, which transmits power for moving the carriage 110 in the S-direction. The timing belt 27 is looped between pulleys 29A and 29B arranged at the two side portions of the apparatus. One pulley 29B receives a rotational driving force from a carriage motor 31 through a transmission mechanism such as gears.

A platen roller 33 regulates a recording surface of a recording medium (to be also referred to as a recording sheet hereinafter) such as a paper sheet, and coveys the recording medium in, e.g., recording. The platen roller 33 is driven upon rotation of a feed motor 35. A paper pan 37 guides a recording medium from a paper supply tray (not shown) to the recording position. Feed rollers 39 are arranged midway along a recording medium supply path, and urge the recording medium against the platen roller 33 to feed it. A paper discharge roller 41 is arranged at the downstream side of the recording position in the feed direction of the recording medium, and discharges the recording medium toward a discharge port (not shown). A spur 42 is arranged in correspondence with the paper discharge roller 41. The spur 42 urges the roller 41 via the recording medium to generate a feed force of the recording medium by the paper discharge roller 41. A release lever 43 is used for releasing the biasing forces of the feed rollers 39, a pressing plate 45, and the spur 42 when, for example, the recording medium is set.

The pressing plate 45 suppresses floating and the like of the recording medium near the recording position so as to assure a contact state of the recording medium with respect to the platen roller 33. In this embodiment, an ink jet recording head for performing recording by ejecting an ink is adopted as the recording head. Therefore, the distance between the ink ejection orifice formation surface of the recording head and the recording surface of the recording medium is relatively small, and must be strictly controlled so as to avoid the recording medium from contacting the ejection orifice formation surface. For this reason, the pressing plate 45 is effectively arranged.

A cap 51 for the recording head is formed of an elastic material such as rubber. The cap 51 opposes the ink ejection orifice formation surface of the recording head at the home position, and is supported to be able to contact/separate from the recording head. The cap 51 is used for the purpose of protection of the recording head in a non-recording state, and in ejection recovery processing of the recording head. In the ejection recovery processing, an ink present in an inward portion of each ink ejection orifice and utilized for ink ejection is ejected, thereby removing factors causing ejection errors such as a bubble, dust, the ink whose viscosity has become too high to be recorded, and the like (preliminary ejection). Besides this processing, the ink is forcibly discharged from each ejection orifice to remove factors causing ejection errors.

A pump 53 is used for applying a suction force for forcible discharge of the ink, and for drawing the ink received by the cap 51 by suction in the ejection recovery processing based on forcible discharge or preliminary ejection. The discharged ink drawn by suction by the pump 53 is stored in a discharged ink tank 55. The pump 53 communicates with the discharged ink tank 55 through a tube 57.

A blade 59 is used for wiping the ejection orifice formation surface of the recording head. The blade 59 is supported to be movable between a position where it projects toward the recording head to perform wiping during movement of the head, and a retracted position where it is not engaged with the ejection orifice formation surface. A cam device 63 receives driving power from a motor 61 to drive the pump 53 and to move the blade 59, respectively.

The details of the above-mentioned head cartridge 90 will be described below.

FIG. 4 is a perspective view of the head cartridge 90 used as a recording means of the printer used in this embodiment. The head cartridge 90 is of a disposable type formed integrally with an ink storage portion as an ink supply source.

A recording head portion IJH of the cartridge 90 comprises a heater board (not shown) constituted by forming electro-thermal converting elements (ejection heaters) and an Au (gold) wiring pattern for supplying electric power to the heaters on an Si (silicon) board by a film formation technique.

The recording head portion IJH comprises a supply tank for supplying an ink, which serves as a sub-tank for receiving the ink from an ink tank IT as an ink supply source, and guiding the ink to a common ink chamber formed upon junction between the heater board and a top plate. The ink tank IT incorporates an absorbing member for impregnating the ink, and is arranged in an ink tank main body 9b.

A vent hole 1400 is formed in a lid member to communicate the interior of the cartridge 90 with the outer air. A repellent is arranged inside the vent hole 1400, thereby preventing ink leakage from the vent hole 1400.

The ink is supplied from the interior of the cartridge 90 to the supply tank constituting the recording head via a supply port. The ink flows through the supply tank, and then flows from an outlet port into the common ink chamber via a proper supply tube and an ink inlet port of the top plate. The ejection heaters are heated on the basis of a predetermined recording signal, and the ink is ejected by utilizing the heat energy, thus obtaining a desired recorded image.

FIG. 5 shows the arrangement of a nozzle array of the recording head portion IJH of the printer 200 of this embodiment.

As shown in FIG. 5, 64 nozzles numbered from 1 to 64 are arranged in line in the N-direction (main scan direction). A pitch a between adjacent nozzles corresponds to 1/360 inches, i.e., a resolution of 360 dpi. When the recording head is moved in the direction of the arrow S, i.e., in the subscan direction together with the carriage 110 upon rotation of the carriage motor 31 (FIG. 3), two-dimensional image formation is realized. The paper feed amount by the paper feed motor 35 corresponds to this nozzle array. More specifically, after an image is formed using the 64 nozzles, a paper sheet is fed in the main scan direction by an mount corresponding to 64 dot pitches corresponding to the total length of the 64 nozzles of the recording head portion IJH, i.e., by 64/360 inches, thus preparing for recording for the next line.

First Embodiment

Figure 6:
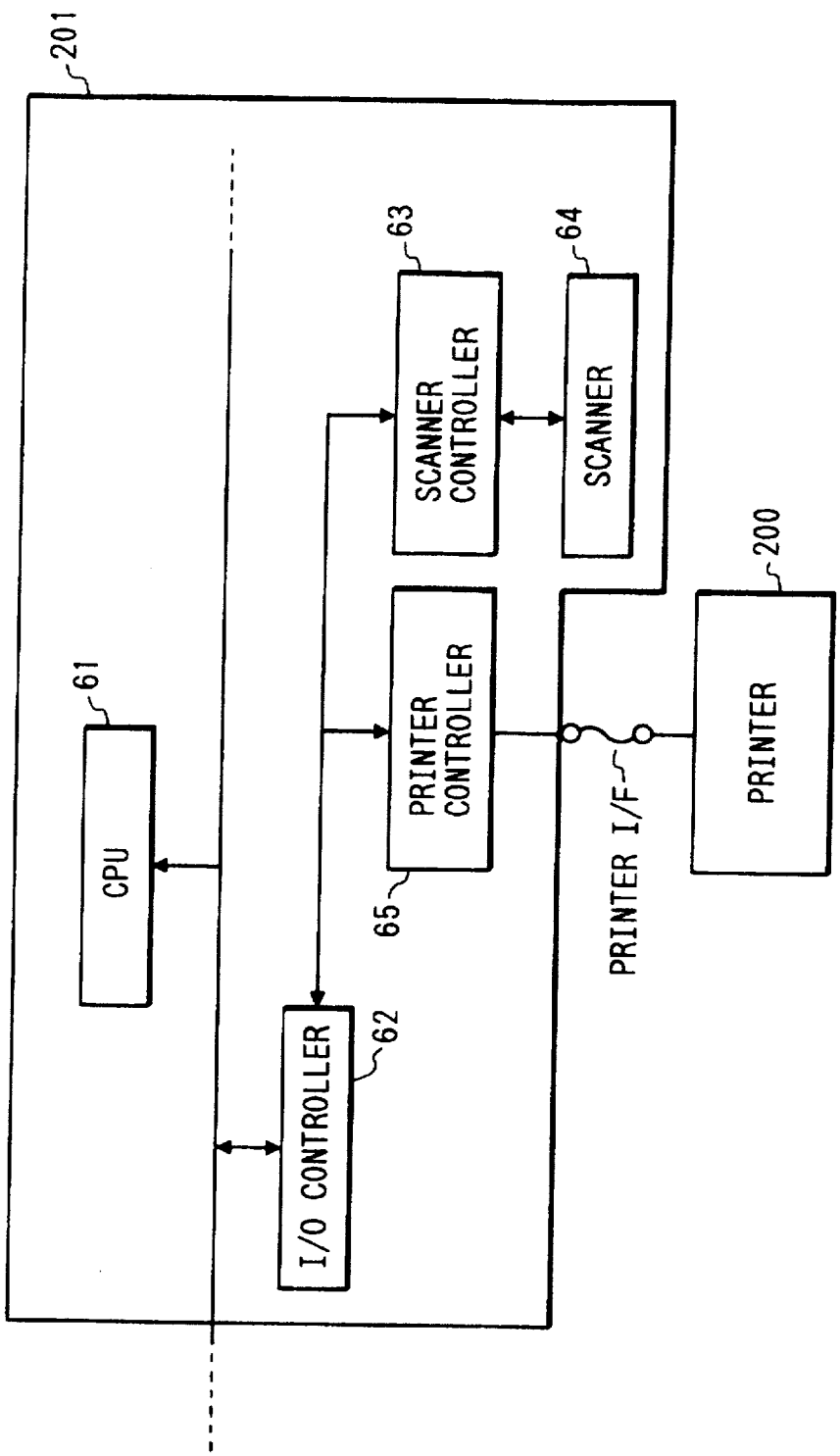
FIG. 6 is a schematic block diagram showing an arrangement of a main body apparatus of the first embodiment.

FIG. 6 is a schematic block diagram showing an arrangement of the main unit 201 of the first embodiment. The respective units shown in FIG. 6 will be described below.

A CPU 61 controls the entire system, and performs various calculations. The fundamental clock frequency of the CPU 61 is 10 MHz. An I/O controller 62 controls standard input/output (I/O) devices other than memories. More specifically, the I/O controller 62 executes 8-bit/16-bit bus conversion and address coding to receive addresses, data, and control information from the CPU 61, and to transfer them to a floppy disk controller (not shown), a real-time clock (not shown), hard disk controller (not shown), a TEL·FAX·sound source controller (not shown), and the like. The I/O controller 62 also performs bus control (e.g., DMA control) for transferring these data to a scanner controller 63 and a printer controller 65.

A scanner 64 reads an original image, and converts it into an electrical signal. As described above, the scanner 64 is arranged inside the upper surface of the rear portion of the main body unit. In the scanner 64, a light source for radiating an original surface is an LED, and the reading resolution of the scanner 64 is 200 dpi. When the scanner 64 is connected to the main body through the scanner controller 63, the read image signal can be processed by a binary method or an error diffusion method, and can be input. The scanner controller 63 controls and drives the mechanism portion of the entire scanner 64, and performs image reading control based on the binary method/halftone method (error diffusion method).

In this embodiment, as the printer 200, an ink jet printer utilizing heat energy is separately connected. Even when image data having a resolution of, e.g., 200 dpi is processed in the main unit 201, since the printer controller 65 performs image conversion and recording control of the printer 200, as will be described later, the processed data can be output to and recorded by the printer 200 having the resolution of 360 dpi. The printer controller 65 converts image data input from the I/O controller 62 into a parallel signal, and outputs the parallel signal to the printer 200 through a printer interface (I/F). Note that vertical-horizontal conversion of image data can also be performed by the printer controller 65. As described above, the main unit 201 may process image data having various resolutions such as a facsimile received image, a computer received image, and the like, and may output them to the printer 200. Therefore, in this embodiment, the printer controller 65 performs resolution conversion of these image data.

The arrangement of the printer controller 65 will be described below with reference to FIG. 1, which is a block diagram of the printer controller 65.

Figure 1:
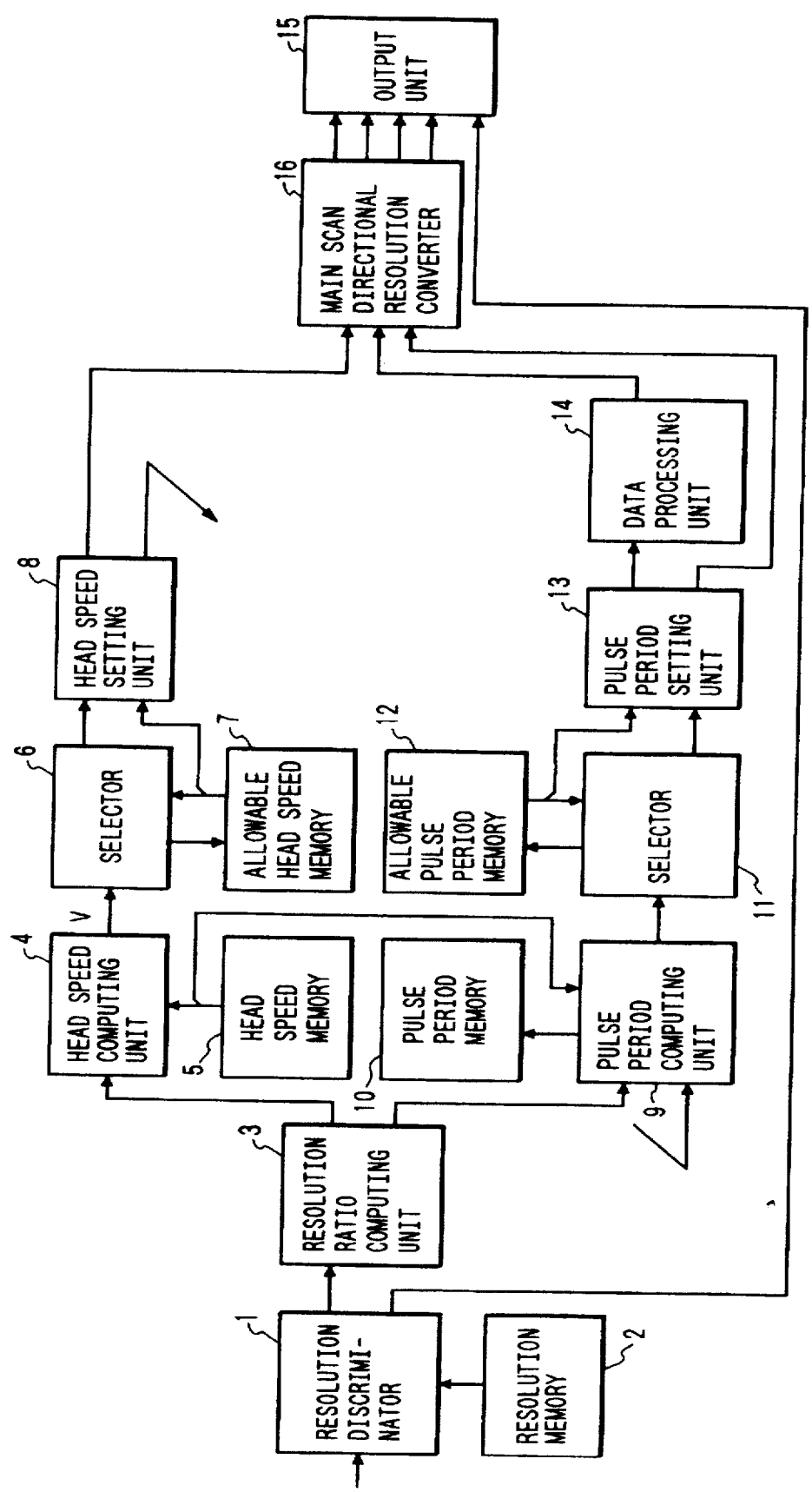
FIG. 1 is a schematic block diagram showing an arrangement of a printer controller according to the first embodiment of the present invention.

In FIG. 1, a resolution discriminator 1 discriminates whether or not the resolution of image data input from the CPU 61 coincides with that of the printer 200 stored in a resolution memory 2. If the input image data has a resolution equal to that (360 dpi) of the printer 200, it is directly output to the printer 200 via an output unit 15. On the other hand, if the input image data has a resolution different from that (360 dpi) of the printer 200, a resolution ratio computing unit 3 computes the ratio of these resolutions. When the resolution of the printer 200 is represented by $P_0$ and that of image data is represented by P, the ratio is expressed by $(P_0/P)$.

A head speed computing unit 4 reads out a feed speed value of the recording head at the resolution of 360 dpi of the printer 200, which value is stored in a head speed memory 5, and computes a scan speed V of the recording head of the printer 200 when the image data is printed. In this case, the speed V is given by:

$$V = (P_0/P)V_0 \quad (P \neq 0) \tag{1}$$

where $V_0$ is the original scan speed of the recording head when the printer 200 performs recording at 360 dpi. When recording is performed at 320 dpi using the printer 200, the scan speed V of the recording head is $V=(360/320)V_0=1.125V_0$; when recording is performed at 480 dpi, $V=(360/480)V_0=0.75\ V_0$.

The upper limit (e.g., 400 pps (pulses/second)) and the lower limit (e.g., 250 pps) of the scan speed of the recording head, which are determined by the characteristics of the carriage motor 31, are pre-stored in an allowable head speed memory 7, and the computation result is compared with the stored allowable values. If the head speed computed by the head speed computing unit 4 falls within an allowable range, the computed head speed (V) is selected by a selector 6, and is output to a head speed setting unit 8. Thus, this head speed value is output to a main scan directional resolution converter 16.

When the head speed computed by the head speed computing unit 4 falls outside the allowable range, a speed value within the allowable range closest to the computed head speed is selected, and is output to the main scan directional resolution converter 16 through the head speed setting unit 8.

Processing for computing a period of a pulse signal for driving the recording head of the printer 200, which period is changed upon a change in head speed, will be described below.

A pulse period computing unit 9 reads out a pulse period (e.g., 3 kHz) stored in a pulse period memory 10 and used when the printer 200 performs recording at 360 dpi, and a new pulse period T is computed on the basis of the readout value and the resolution ratio ($P_0/P$) computed by the resolution ratio computing section 3. The pulse period T is given by:

$$T = (P_0/P)T_0 (P \neq 0) \quad (2)$$

where $T_0$ is the pulse period (ink ejection period) used when the printer performs recording at 360 dpi. When recording is performed at, e.g., 320 dpi using the printer 200, $T=(360/320)T_0=1.125T_0$; when recording is performed at 480 dpi, $T=(360/480)T_0=0.75T_0$.

It is then checked if the computed pulse period value falls within an allowable range (e.g., 2.25 kHz to 3.6 kHz) stored in an allowable pulse period memory 12. If the computation result falls within the allowable range, the computed value is selected by a selector 11, and is output to a pulse period setting unit 13. Thus, the computed pulse period is output to the main scan directional resolution converter 16.

On the other hand, if the computed pulse period falls outside the allowable range, since the resolution (e.g., 251 dpi or lower, or 540 dpi or higher) cannot be coped with by only changing the scan speed of the recording head or the pulse period, a pulse period within the allowable range and closest to the computation result is selected, and the selected value is output to a data processing unit 14. The data processing unit 14 performs interpolation or thinning processing of image data in the subscan direction. The main scan directional resolution converter 16, which received image data output from the data processing unit 14, performs interpolation or thinning processing of the image data, so that the main scan directional resolution of the image data is converted to 360 dpi.

In this manner, according to this embodiment, in order to output image data having a resolution different from that of the printer 200, and to print the image data, the scan speed of the recording head of the printer 200 or the ejection period of the ink (i.e., the driving pulse period of the recording head) is changed. In this case, as for the S-direction as the subscan direction, image data is output without being processed, and as for the N-direction as the main scan direction, interpolation or thinning processing is performed according to the resolution of the image data.

The relationship among the scan speed of the recording head of the printer 200, the ink ejection period, and the resolution will be explained below with reference to FIGS. 7a to 8c.

FIG. 7a shows a print result of image data having the same resolution as that (360 dpi) of the printer 200. FIG. 7b shows a print result of image data having a resolution (320 dpi) lower than that (360 dpi) of the printer 200 (in this case, the original length of recorded image data is the same as that in FIG. 7a). FIG. 7c shows a print result of image data having a resolution (480 dpi) hither than that (360 dpi) of the printer 200 (in this case, the original length of recorded image data is also the same as that in FIG. 7a). The fact that the resolution is low means that the information amount per unit length is small. Contrary to this, the fact that the resolution is high means that the information amount per unit length is large.

More specifically, information having a resolution of 360 dpi and expressed by 9 dots corresponds to 8 dots when the resolution is 320 dpi, and corresponds to 12 dots when the resolution is 480 dpi. Therefore, even when image data have equal lengths, if the resolution of the printer 200 does not coincide with those of image data, recorded images have different lengths according to their resolutions, as shown in FIGS. 7a, 7b, and 7c. In order to maintain the size of a recorded image constant regardless of its resolution, when image data having a resolution lower than that of the printer 200 is to be printed, processing for increasing the dot pitch is required; when image data having a resolution higher than that of the printer 200 is to be printed, processing for decreasing the dot pitch is required. The increase in dot pitch to be printed can be realized by only increasing the scan speed of the recording head according to equation (1) described above. Similarly, the decrease in dot pitch to be printed can be realized by only decreasing the scan speed of the recording head according to equation (1) described above.

FIGS. 8b and 8c show application results of this processing method to FIGS. 7b and 7c.

On the other hand, the same effects can be obtained by only changing the ink ejection period of the recording head. That is, the increase in dot pitch can be realized by prolonging the period according to equation (2) described above, and the decrease in dot pitch can be similarly realized by shortening the pulse period according to equation (2). Upon application of this method, the recording results shown in FIGS. 8b and 8c can be obtained in the same manner as in a case wherein the scan speed of the recording head is changed.

The same effects can also be expected by changing the scan speed of the recording head of the printer 200 and the ink ejection period in combination with each other. Thus, the applicable resolution range of image data can be widened. The relationship among the resolution (P) of data, the scan speed (V) of the recording head, and the ink ejection period (T) at this time is expressed by:

$$V \times T = P_0(V_0 \times T_0)/P (P \neq 0) \quad (3)$$

Note that the combination of the scan speed of the recording head and the ink ejection period depends of the performance of the carriage motor 31 (FIG. 3) for driving the recording head, as a matter of course.

Figure 9:
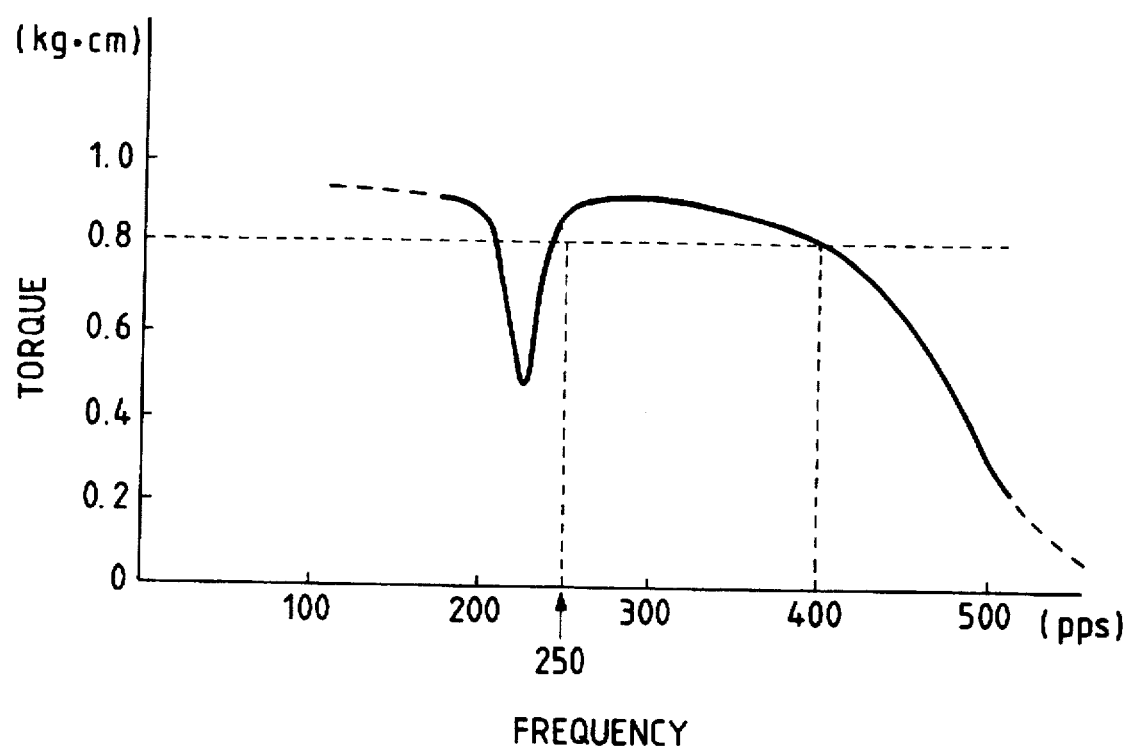
FIG. 9 is a graph showing the relationship between the driving frequency and the generated torque of a carriage motor in the printer of the first embodiment.

FIG. 9 shows the relationship between the driving frequency (rotational speed) and the motor torque of the carriage motor 31.

When the driving frequency falls within a range between 210 pps and 240 pps, the torque is extremely decreased due to a resonance phenomenon between the driving frequency of the carriage motor 31 and the driving mechanism of the carriage 110, and a recording operation is disabled. In this embodiment, since a torque of at least 0.8 kg·cm is required for driving the recording head, the carriage motor 31 is normally rotated at 300 pps.

Therefore, as can be seen from FIG. 9, the driving frequency of the carriage motor 31 can be changed between 250 pps and 400 pps at which the torque exceeds 0.8 kg·cm. From equation (1) described above, the resolution P that can be coped with by changing only the scan speed of the recording head is given by $P=P_0 \times V_0/V$. Since $P_0=360$ dpi and $V_0 =300$ pps, when the driving frequency of the carriage motor 31 is 250 pps, we have:

$$P=300(pps)\times 360(dpi)/250(pps)=432(dpi)$$

When the driving frequency of the carriage motor 31 is 400 pps, we have:

$$P=300(pps)\times 360(dpi)/400(pps)=270(dpi)$$

More specifically, when the resolution of image data to be printed falls within a range between 270 dpi and 432 dpi, it can be coped with by only changing the scan speed of the recording head. Figs. 10A to 10D show the relationship between the ink ejection pulses and the driving pulses for the carriage motor 31 in this case.

Figure 10:
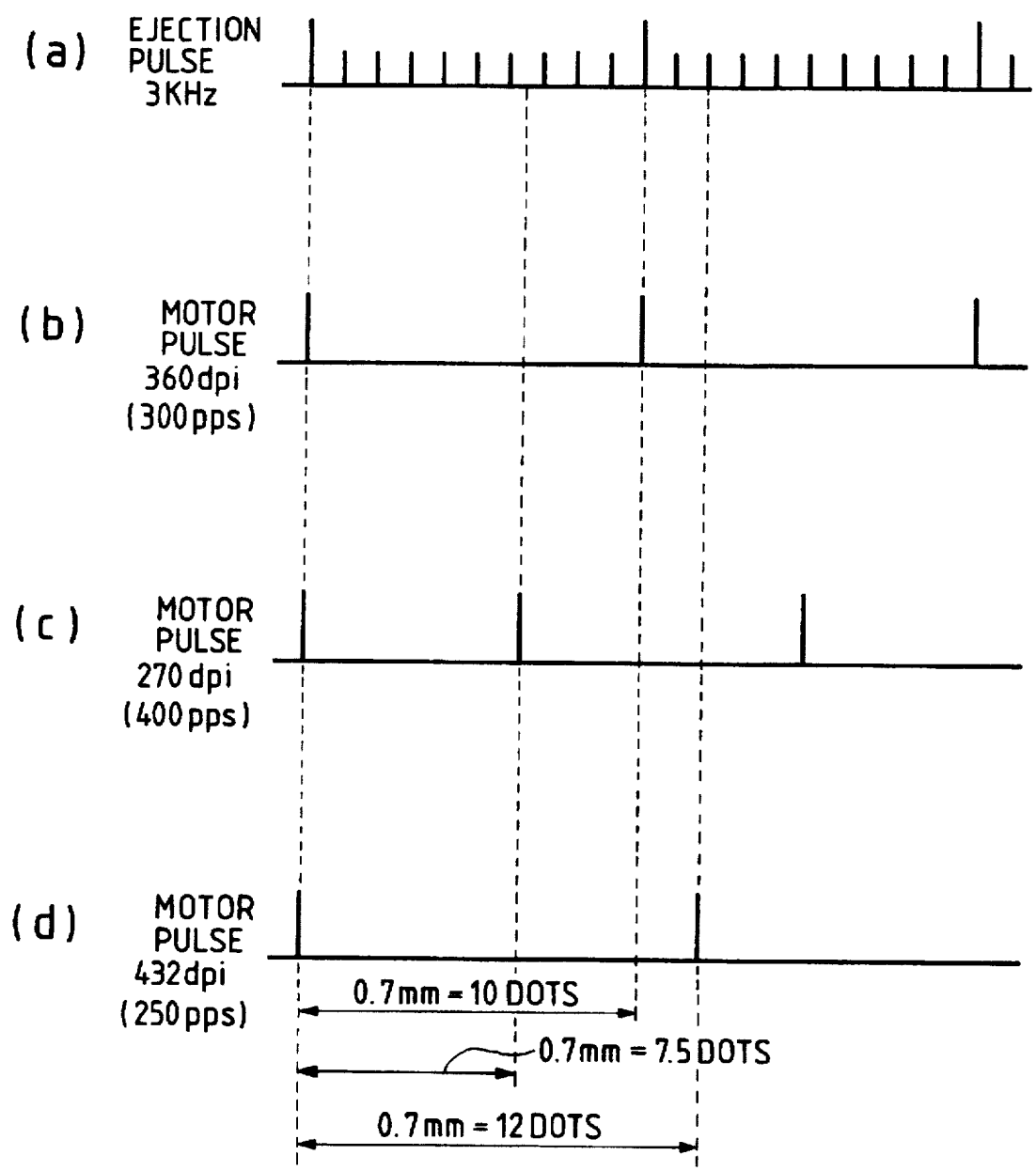
FIGS. 10(a) to 10(d) are charts showing the relationship between the ink ejection pulse period and the head driving pulses in the printer of the first embodiment.

FIG. 10a shows the timings of the ink ejection pulses. In this case, ejection is performed at a period of 3 kHz. FIG. 10b shows the timings of the driving pulses of the carriage motor 31 upon printing at a resolution of 360 dpi. In this case, the carriage motor 31 is driven at 300 pps. FIG. 10c shows the timings of the driving pulses of the carriage motor 31 upon printing at a resolution of 270 dpi. In this case, the carriage motor 31 is driven at 400 pps. Furthermore, FIG. 10d shows the timings of the driving pulses of the carriage motor 31 upon printing at a resolution of 432 dpi. In this case, the carriage motor 31 is rotated at 250 pps.

In this manner, when image data having a resolution of 270 dpi is to be printed, the driving frequency of the carriage motor 31 need only be changed to 400 pps. However, when image data having a resolution of, e.g., 432 dpi or higher is to be printed, since this resolution cannot be coped with by only changing the scan speed of the recording head, the driving frequency of the carriage motor 31 must be fixed to 255 pps near 250 pps, and the ink ejection pulse period must be changed according to equation (3) described above so as to control the dot pitch to be recorded.

When the dot pitch is to be controlled, the following two points must be taken into consideration.

(1) When the recorded dot pitch is too wide, connection of dots is broken, and quality of the recorded image is deteriorated.

(2) Contrary to this, when the recorded dot pitch is too narrow, dots overlap each other, and an image cannot be identified.

Thus, in order to prevent the above-mentioned two problems, the upper and lower limits of the dot pitch are determined as follows.

Figure 11A:
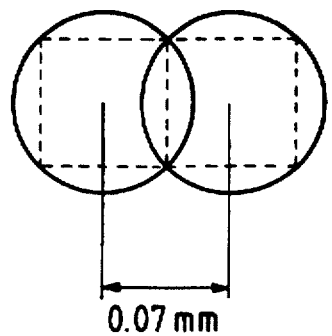
FIGS. 11(a) to 11(c) are views for explaining the upper and lower limits of the dot interval in the printer of the first embodiment.
Figure 11B:
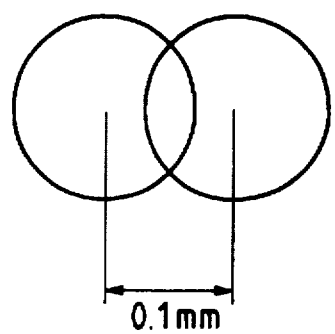
Figure 11C:
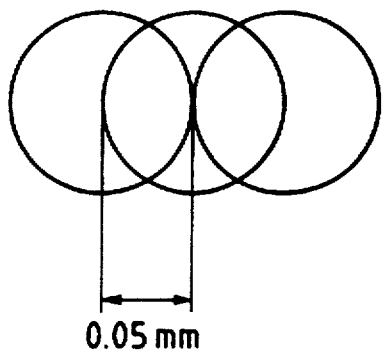

In the ink jet printer of this embodiment, a dot to be recorded is circular. Therefore, in order to avoid formation of a blank portion in a solid-black image, a recording dot is designed to be a circumscribed circle (diameter=0.1 mm) of a pixel, as shown in FIG. 11a. Thus, based on this dot size (0.1 mm), the upper limit of the recorded dot pitch is set to be 0.1 mm (FIG. 11a), and the lower limit is set to be 0.05 mm (FIG. 11c).

As shown in FIG. 11a, since the dot pitch of image data having a resolution of 360 dpi is 0.07 mm, we have:

$$0.07\ mm\times 360\ (dpi)/0.1\ mm=252\ (dpi)$$

$$0.07\ mm\times 360\ (dpi)/0.05\ mm=504\ (dpi)$$

In this manner, the resolution of image data that can be coped with by changing the ink ejection pulse period and the driving frequency of the carriage motor 31 (the scan speed of the recording head) ranges between 252 dpi and 504 dpi.

FIG. 12A shows the relationship between the ink ejection pulses and the driving frequency of the carriage motor 31 when image data having a resolution of 252 dpi is to be output, and FIG. 12B shows the relationship between the ink ejection pulses and the driving frequency of the carriage motor 31 when image data having a resolution of 504 dpi is to be output.

In FIG. 12A, since the driving frequency of the carriage motor 31 is set to be a maximum value (400 pps) at which the torque of 0.8 kg·cm can be assured, the ink ejection pulse frequency is set to be:

$$3(kHz)\times (0.07\ (mm)/0.1(mm))\times (400\ (pps)/300\ (pps))=2.8\ kHz$$

Similarly, when the resolution of image data is 504 dpi, if the driving frequency of the carriage motor 31 is set to be a minimum value (250 pps) according to FIG. 9, the ink ejection pulse frequency is set to be:

$$3(kHz)\times (0.07\ (mm)/0.05\ (mm))\times (250\ (pps)/300\ (pps))=3.5\ kHz$$

As described above, according to the first embodiment, when image data having a resolution different from that of the printer is output to and printed by the printer, original image data can be accurately printed by changing the scan speed of the recording head of the printer and/or the ink ejection period of the recording head, while preventing omission of image data, distortion, and the like.

Second Embodiment

The second embodiment of the present invention will be described below. The second embodiment exemplifies a printer which can perform printing by changing the scan speed of a recording head during one scan period of the recording head.

Figure 13:
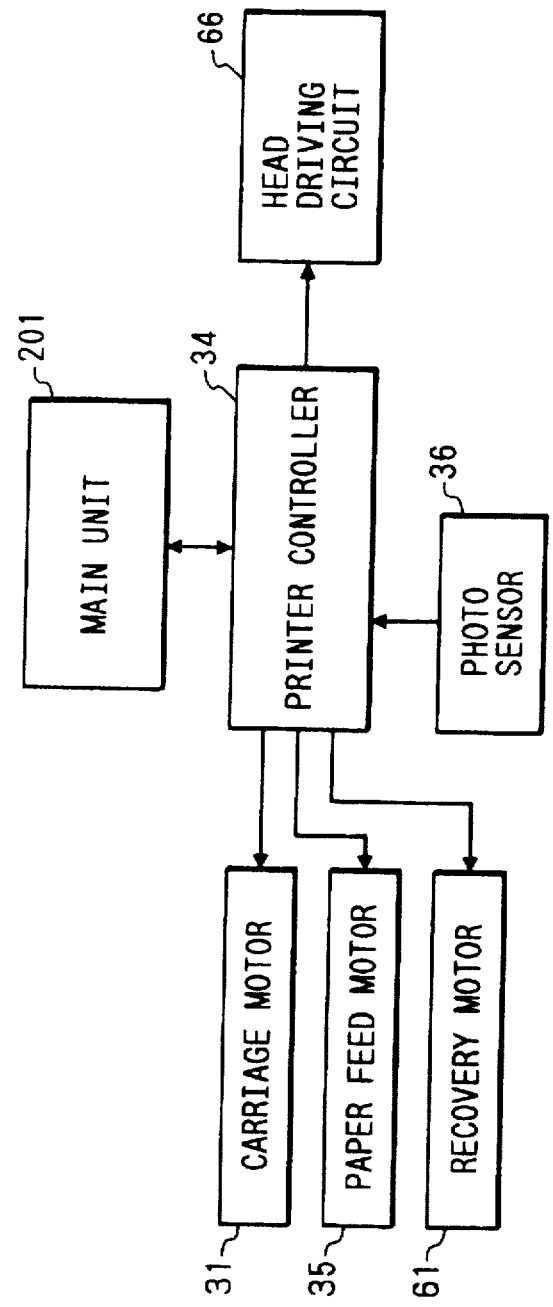
FIG. 13 is a schematic block diagram showing an arrangement of a printer according to the second embodiment of the present invention.

FIG. 13 is a schematic block diagram showing an arrangement of a printer 200. A printer controller 34 is incorporated in the printer 200, and controls a carriage motor 31 according to a control command from a main unit 201 so as to allow recording operations at resolutions of 360 dpi×360 dpi and 360 dpi×200 dpi by a method to be described later. A head driving circuit 66 drives the recording head, and controls an application voltage to ejection heaters corresponding to 64 nozzles of the recording head.

FIGS. 14a and 14b show the relationships among printed dots obtained when recording operations are respectively performed at subscan directional resolutions of 360 dpi and 200 dpi. FIG. 14a shows dots printed at a resolution of 360 dpi, and FIG. 14b shows dots printed at a resolution of 200 dpi. In this manner, the dots printed at a resolution of 200 dpi have a smaller number of dots per unit length than dots printed at a resolution of 360 dpi. When data having different resolutions are to be output, the scan speed of the recording head or the ink ejection period is changed, so that images are printed to have an equal size.

FIG. 15 shows the relationship between the scan speed of the recording head and the ejection period. A scan speed V of the recording head at a resolution of 200 dpi at that time is given by:

$$V=(360/200)\times V_0$$

where $V_0$ is the scan speed of the recording head at a resolution of 360 dpi. More specifically, in this embodiment, since the frequency of the driving pulses of the carriage motor 31 upon recording at a resolution of 360 dpi is set to be 500 pps, the frequency of the driving pulses of the carriage motor 31 upon recording at 200 dpi is set to be 900 pps.

Figure 16A:
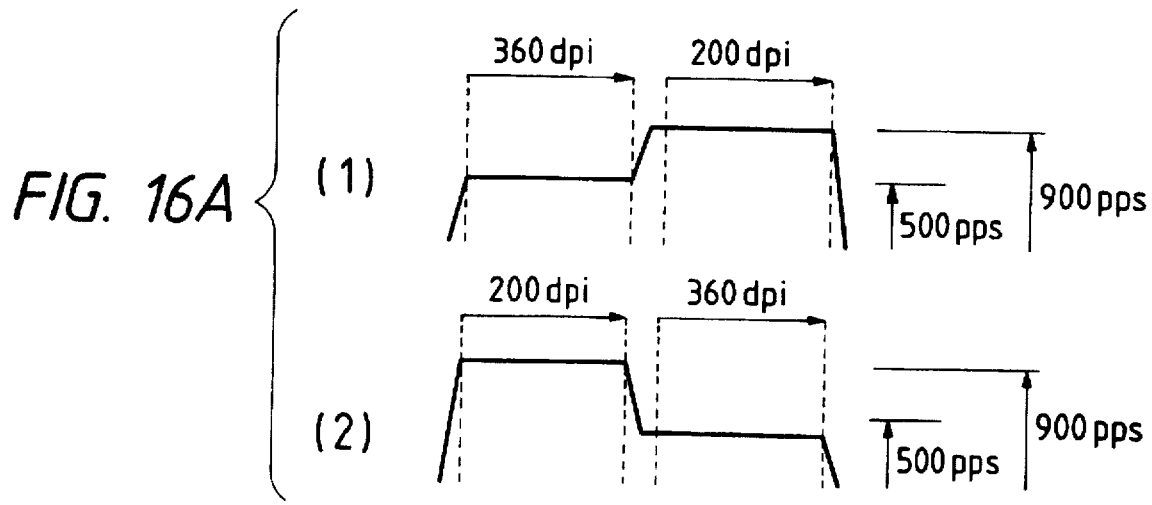
FIGS. 16A and 16B are charts showing a method of controlling the driving pulses of a carriage motor in the printer of the second embodiment.
Figure 16B:
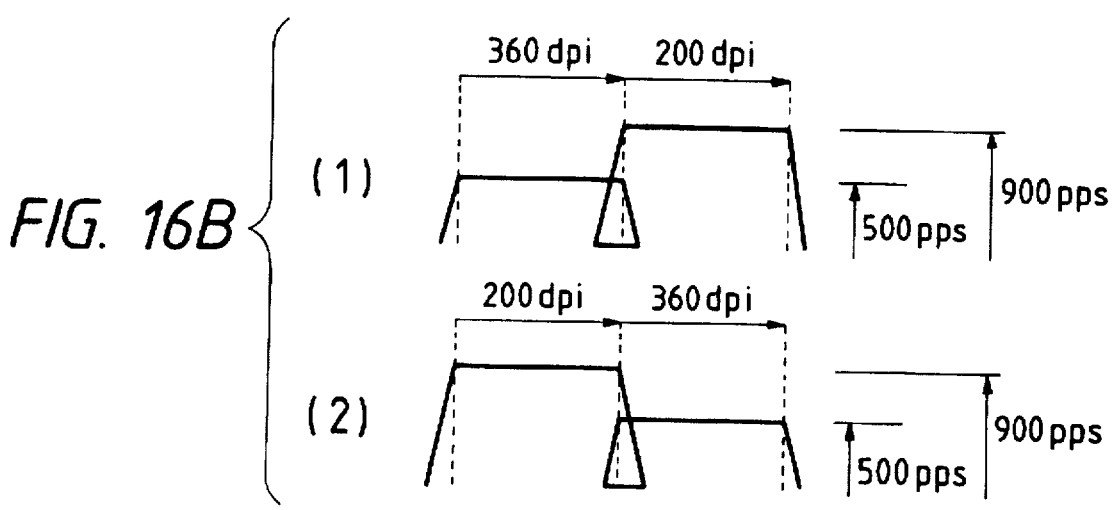
Figure 17:
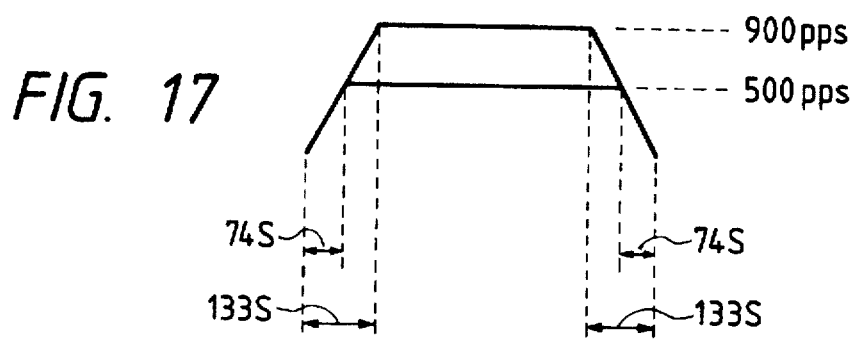
FIG. 17 is a graph showing the slow-up/slow-down characteristics of the carriage motor in the printer of the second embodiment.

Upon reception of a recording speed setting command according to the resolution issued from the main unit 201, the printer controller 34 controls the driving pulses of the carriage motor 31, as shown in FIGS. 16A and 16B. In general, a stepping motor requires a slow-up/slow-down (ramp-up/ramp-down) operation to attain acceleration/ deceleration, and hence, requires a slow-up/slow-down moving distance according to the resolution. FIG. 17 shows this state. As can be seen from FIG. 17, the printer 200 of this embodiment is accelerated/decelerated to/from 500 pps by 74 steps, and is accelerated/decelerated to/from 900 pps by 133 steps. The same applies to the slow-down operation. From this fact, in this embodiment, acceleration from 0 to 500 pps requires a moving distance of 30.0 mm, and acceleration from 0 to 900 pps requires a moving distance of 55.5 mm.

FIG. 16A shows a case wherein one scan period includes a blank portion of an image corresponding to a carriage moving distance for achieving the slow-up and slow-down operations, i.e., a distance capable of performing a slow-up/ slow-down operation from 500 pps to 900 pps or from 900 pps to 500 pps (i.e., 55.5−30.0=25.5 mm).

(1) of FIG. 16A shows a characteristic curve of the motor driving pulses when recording at 360 dpi (carriage motor driving pulse=500 pps) is changed to recording at 200 dpi (carriage motor driving pulse=900 pps).

(2) of FIG. 16A shows a characteristic curve of the motor driving pulses when recording at 200 dpi (carriage motor driving pulse=900 pps) is changed to recording at 360 dpi (carriage motor driving pulse=500 pps).

In this manner, if a blank portion corresponding to a distance capable of performing a slow-up/slow-down operation of the carriage remains when the resolution of image data is changed, the scan speed of the carriage can be changed while scanning the carriage in the same direction.

FIG. 16B shows a case wherein one scan period of an original image does not include a blank portion corresponding to a distance capable of performing a slow-up/slow-down operation of the carriage, i.e., a distance capable of performing a slow-up/slow-down operation from 500 pps to 900 pps or from 900 pps to 500 pps (i.e., 55.5−30.0=25.5 mm). In this case, since there is no blank portion wide enough to change the scan speed of the carriage, the rotation of the carriage motor 31 is temporarily stopped, and thereafter, the carriage motor 31 is reversed to assure the distance necessary for accelerating the carriage. Then, the carriage is accelerated in the original direction to obtain a necessary carriage speed.

(1) of FIG. 16B shows a motor driving characteristic curve when recording at 360 dpi (carriage motor driving pulse=500 pps) is changed to recording at 200 dpi (carriage motor driving pulse=900 pps). In the illustrated case, the carriage must be moved in the reverse direction by at least 55.5 mm from the start position of recording at 200 dpi.

(2) of FIG. 16B shows a motor driving characteristic curve when recording at 200 dpi (carriage motor driving pulse=900 pps) is changed to recording at 360 dpi (carriage motor driving pulse=500 pps). In the illustrated case, the carriage must be moved in the reverse direction by at least 30.0 mm from the start position of recording at 360 dpi.

The operation of the main unit 201 for outputting recording data to the above-mentioned printer 200 will be described below. Since the arrangement of the main unit 201 is the same as that of the first embodiment shown in FIG. 6, a detailed description thereof will be omitted.

Figure 18:
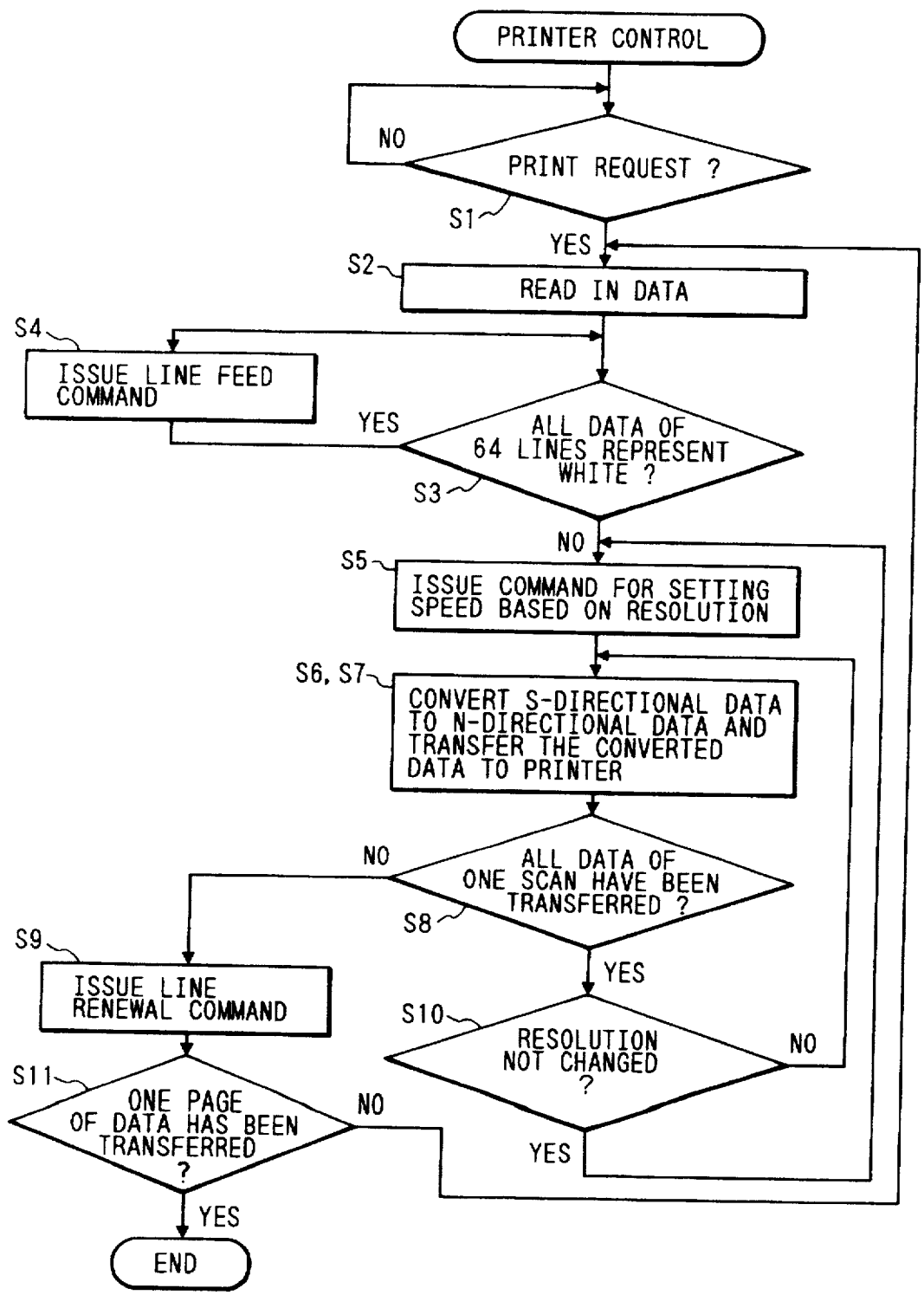
FIG. 18 is a flow chart showing a printer control operation in the second embodiment.

FIG. 18 is a flow chart showing an operation of a printer controller 65 shown in FIG. 6.

Upon reception of a print request from an I/O controller 62 (step S1), the printer controller 65 moves the recording head (90) to the home position. At the same time, the printer controller 65 reads recording data (character data and image data) in a data format to be described later for 64 lines from the I/O controller 62, and stores the read data in an internal buffer memory. When either of character data or image data is present, the printer controller 65 reads the data. In this case, the printer controller 65 reads image data (200 dpi) at 360 dpi for 64 lines while converting the resolution of image data in the aligning direction (main scan direction) of the nozzles of the recording head from 200 dpi to 360 dpi by vertical resolution conversion to be described later (step S2). The printer controller 65 then checks if all the recording data for 64 lines (the number of lines which can be recorded by a single scan operation of the recording head 90) represent white (step S3). If all the data represent white, the printer controller 65 issues a line feed command for 64 lines to the printer 200 (step S4). On the other hand, if the recording data include a portion to be recorded, the printer controller 65 issues a recording speed setting command corresponding to the recording resolution (step S5).

As described above, since the nozzle array of the recording head is aligned in the main scan direction, vertical-horizontal conversion or conversion of S-directional data to N-directional data (to be described later) for converting recording data stored on the memory in the subscan direction to those in the main scan direction is performed (step S6). The converted recording data for one vertical line (64 bits) are transferred to the printer (S7). It is checked if the data transferred in the immediately preceding transfer step is the last data having a resolution at that time (step S10). If it is determined that the next data has a different resolution, the flow returns to step 5; otherwise, the flow returns to steps S6 and S7.

If all the data for 64 lines (one scan period) are transferred (step S8), a line renewal command for 64 lines (one scan period) is issued (step S9), and the above-mentioned processing is repeated until it is determined that data transfer for one page is completed (until "YES" is determined in step S11).

FIGS. 19a and 19b show the data formats of recording data to be output from the printer controller 65 to the printer 200 in the second embodiment.

The recording data include two types of data formats, i.e., character data (image data of character patterns) having a resolution of 360 dpi, and image data (facsimile received data or image data read by a scanner 64) having a resolution of 200 dpi. As shown in FIG. 19a, at the beginning of character data, a control (discrimination) code "00H" indicating a resolution of 360 dpi, record line start position data L1 (16 bits) indicating the start position of a line to be recorded, and record column start position data C1(16 bits) indicating the start position of a column to be recorded are sent, and thereafter, 64 (dots)×360 (dpi)×record width (horizontal length) recording data a1, a2, . . . (indicating a total number of bits) are sent in units of 8-bit parallel data. The last character data can be recognized since both the record start position data L1 and C1become "FFFFH".

As shown in FIG. 19b, the image data starts with a code "FFH" indicating a resolution of 200 dpi, and thereafter, record line start position data L2 (16 bits) indicating the start position of a line to be recorded and record column start position data C2 (16 bits) indicating the start position of a column to be recorded are added. Then, 36 (dots)×200 (dpi)×record width recording data a1, a2, . . . are sent in units of 8-bit parallel data. The last image data can be recognized since both the record start position data L2 and C2 become "FFFFH".

The vertical-horizontal conversion processing executed by the printer controller 65 will be described below with reference to FIGS. 20a and 20b.

360 dpi×360 dpi or 360 dpi×200 dpi image data for 64 lines are read and stored in a line buffer (not shown) (in step S2 in FIG. 18), so that dots are arranged in turn in the S-direction like 1, 2, 3, . . . , n, as shown in FIG. 20a. 64-dot data in the N-direction form one block, and the data are transferred in units of blocks, i.e., from the first block to the n-th block, as shown in FIG. 20b. In this case, 64-dot data in one block are divided in units of 8 dots (1-byte data), and 8 bytes, i.e., a total of 64 dots (bits) are transferred.

Note that image format in the 200-dpi format are stored up to only 36 dots in the vertical direction of the buffer memory. Therefore, in this case, 64-dot data must be finally generated in the vertical direction. This processing is vertical resolution conversion processing to be described below.

Figure 21A:
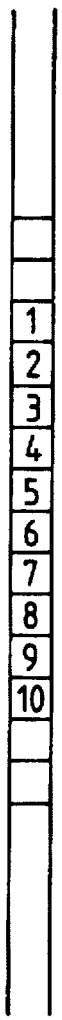
FIGS. 21(a) and 21(b) are views showing a state of resolution conversion in the vertical direction.
Figure 21B:
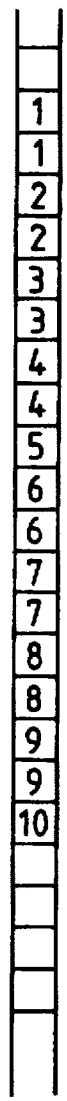
Figure 22:
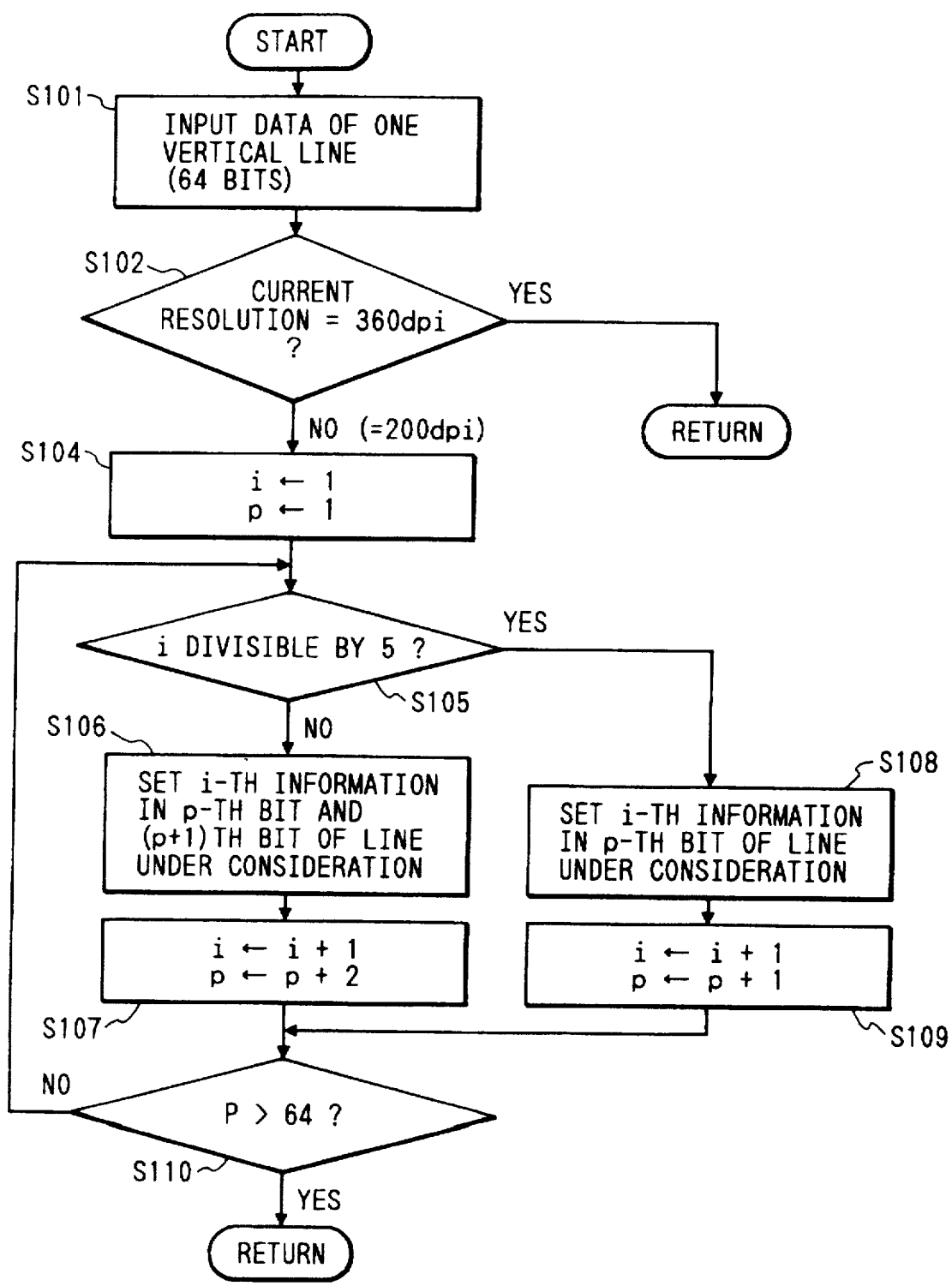
FIG. 22 is a flow chart showing a resolution conversion method in the vertical direction.

FIGS. 21a and 21b and FIG. 22 show the vertical resolution conversion processing. FIG. 22 is a flow chart showing the vertical resolution conversion processing, and FIGS. 21a and 21b show the processing results.

Note that the vertical resolution conversion processing is performed for data in the above-mentioned buffer memory, and a given line in the N-direction in FIG. 20a is assumed to be a line under consideration.

In step S101, data (64 bits) for one vertical line under consideration are input. In step S102, it is checked if the resolution at the line position under consideration is 360 dpi. If YES in step S102, since it is determined that the input 64-bit data can be directly supplied to vertical 64 dots of the recording head, the flow returns to the main routine without any processing.

If it is determined in step S102 that the resolution at the line position under consideration is 200 dpi, since 36 bits of the input 64-bit data are effective, processing in step S104 and subsequent steps is executed to convert these bits to 64 bits.

As initial values, "1" is set in i and p. i is a pointer for indicating a bit position of non-converted information (FIG. 21a), and p is a pointer for indicating a bit position of converted information (FIG. 21b).

The flow then advances to step S105 to check if the content of the pointer i is divisible by "5". If NO in step S105, the flow advances to step S106, and i-th-bit information is written at p-th and (p+1)-th bits from the top of the line under consideration of the buffer memory at that time. In step S107, the pointer i is incremented by "1", and the pointer 2 is incremented by "2". In this manner, as shown in FIG. 21b, of non-converted dot information, all the dots excluding dots divisible by 5 can be successively stored by two dots.

If it is determined in step S105 if the content of the pointer i is divisible by 5, bit information indicated by the pointer i of the read 64 bits is written at the p-th bit from the top of the line under consideration of the buffer memory. In step S109, the pointer i is incremented by "1", and the pointer p is also incremented by "1".

The flow then advances to step S110. In step S110, it is checked if data for 64 bits are generated. The processing in step S105 and subsequent steps is repeated until it is determined that the generation processing is completed. With this processing, as shown in FIG. 21b, lines other than those divisible by 5 appear twice successively, and the resolution in the vertical direction is converted to 1.8 times, i.e., from 200 dpi to 360 dpi.

The above-mentioned processing is executed while sequentially shifting the line under consideration in the S-direction in FIG. 20a. During this interval , the vertical 64-bit data generated in the buffer memory are supplied to the recording head according to a recording timing.

In the second embodiment, when data having different resolutions (e.g., 360 dpi and 200 dpi) are to be output, the scan speed is changed, and the ink ejection period is fixed so as to form an image. However, the same effect can be expected by changing the ink ejection period.

In this case, for example, if the period of the recording application timing at 360 dpi is represented by T0 and the period of the recording application timing at 200 dpi is represented by T, the period T is given by:

$$T=(360/200) \cdot T0$$

In this case, although the scan speed cannot be increased unlike in the first embodiment, the carriage will not be moved in the reverse direction.

As described above, according to the second embodiment, since the dot pitch can be changed by changing the scan speed of the recording head during one scan period of the recording head, images having different resolutions included in a single line can be recorded without causing omission of dots and distortion.

In particular, even when the lowest scan speed of the recording head is set, since recording is executed at a speed corresponding to a resolution that can be reproduced by the apparatus, the overall recording speed associated with image recording can be increased.

In the second embodiment, 200-dpi image data and 360-dpi image data are exemplified as recording resolutions. Of course, this embodiment can cope with other resolutions, and can also be applied to a case wherein data having three or more different resolutions are to be recorded.

Third Embodiment

Figure 23:
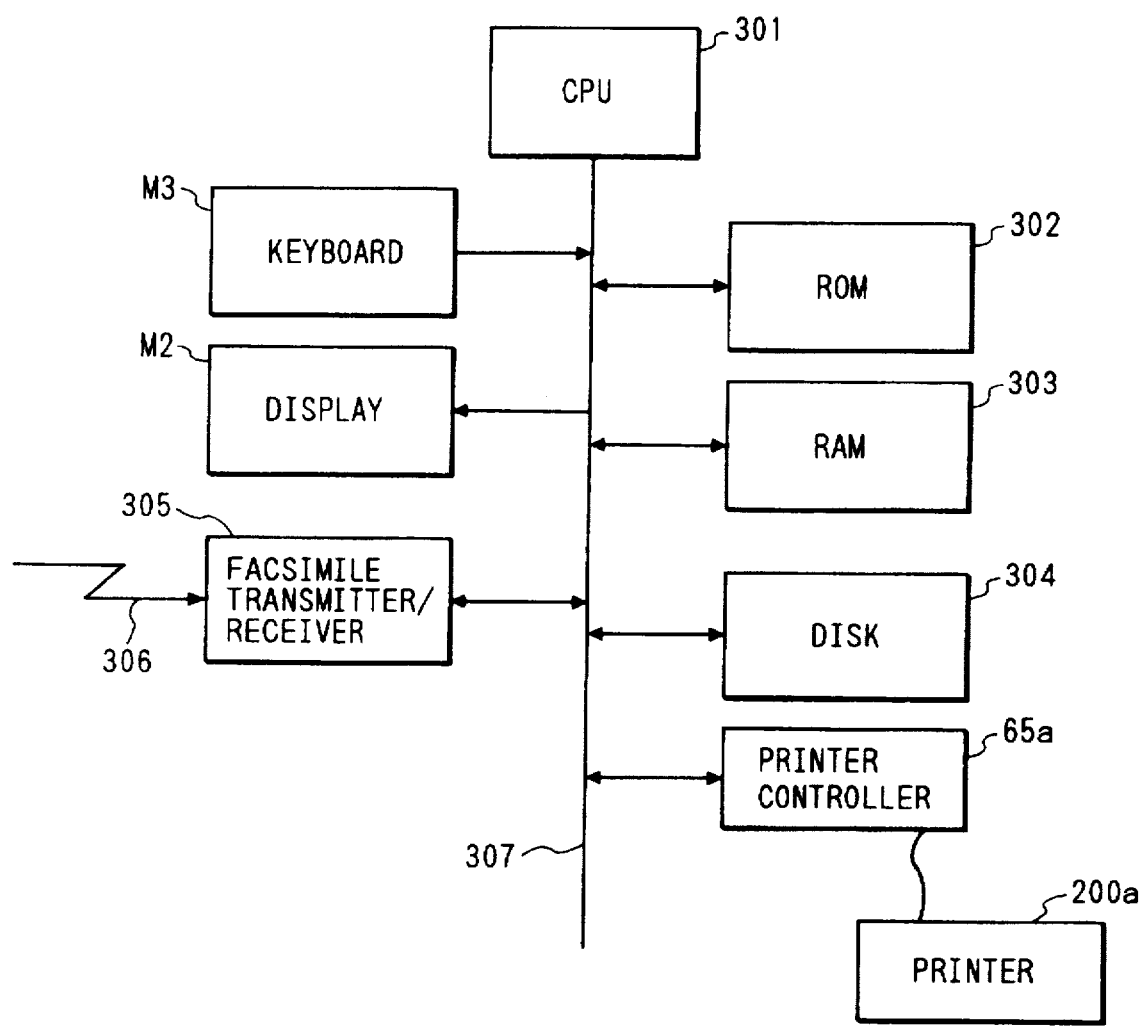
FIG. 23 is a schematic block diagram showing an arrangement of an apparatus according to the third embodiment of the present invention.

The third embodiment of the present invention will be described below with reference to FIGS. 23 to 25. FIG. 23 is a schematic block diagram showing an arrangement of a main unit 201 according to the third embodiment, and the same reference numerals in FIG. 23 denote the same parts as in FIG. 2.

In FIG. 23, a CPU 301 controls the entire main unit 201. A ROM 302 stores a control program for realizing processing of this embodiment, a program for controlling the entire system, and various data. A RAM 303 is used as a working area of the CPU 301, or another program of the CPU 301 is resident in the RAM 303. The RAM 303 is allocated with a buffer memory for storing image data, and various data storage areas. An external storage device 304 comprises, e.g., a hard disk. A variable-speed printer 200a, which can perform recording by changing the scan speed of a recording head, is connected to the main unit 201 through a printer controller 65a. The main unit 201 also includes a keyboard M3, a display M2, a facsimile transmitter/receiver 305, a public line 306, and a system bus 307.

Figure 24:
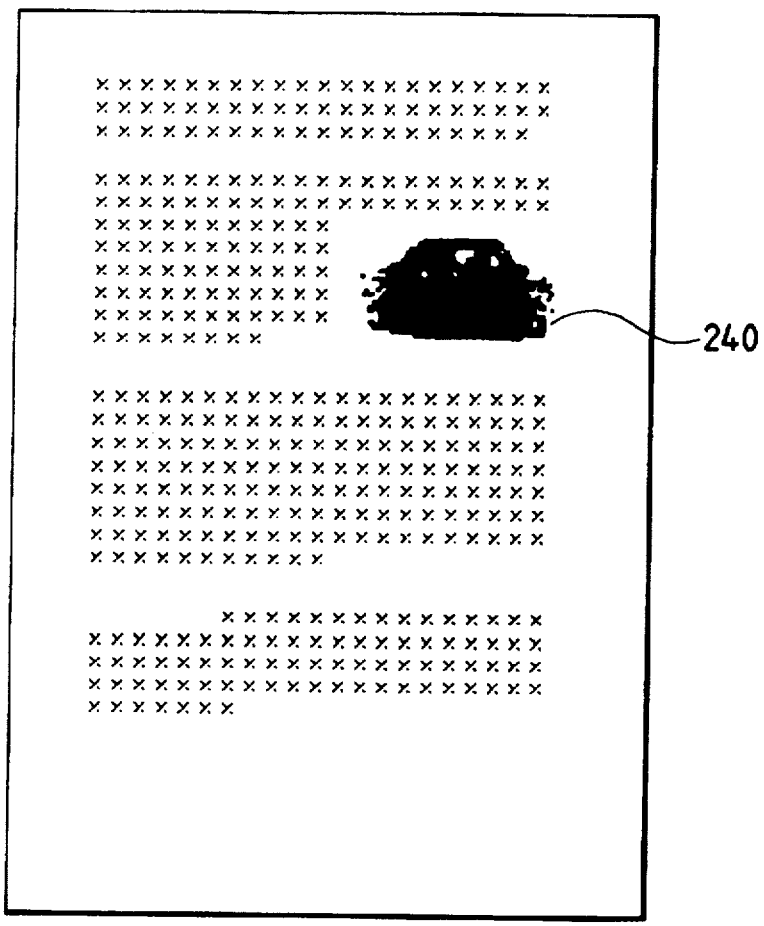
FIG. 24 is a view showing a synthesized image of document data and a facsimile received image.

FIG. 24 shows a state wherein a portion 240 of an image received through the facsimile transmitter/receiver 305 is pasted (superimposed) on document data created by, e.g., a wordprocessor. FIG. 25 is a flow chart showing processing for causing the printer 200a to print document data shown in FIG. 24. The control program for executing this processing is stored in the ROM 302.

Prior to the description of the operation of this embodiment, its premise will be described below. Image data received through the facsimile transmitter/receiver 305 is edited and processed by the control program stored in the ROM 302, and a portion of the image data is pasted on document data of the wordprocessor as one application program of a personal computer, thus forming recording data. The resolution of the facsimile received image is assumed to be 203 dpi, and the resolution of character and figure data input using the wordprocessor function is assumed to be 360 dpi.

In the variable-speed printer 200a, the scan speed in the subscan direction of the recording head is set according to three resolutions, i.e., 203 dpi, 360 dpi, and 406 dpi. More specifically, when the resolution is 406 dpi, the scan speed of the recording head becomes ½ that at a resolution of 203 dpi, and recording data at that time is obtained by simply enlarging 203-dpi recording data at a ×2 magnification. The reason why image data having a resolution of 203 dpi is recorded at a resolution of 406 dpi is that some data should be recorded to be darker depending on the content of an image having a resolution of 203 dpi. Whether recording is performed at a resolution of 203 dpi or 406 dpi is set in advance.

As for the main scan direction, since the resolution cannot be changed due to the nature of a serial printer (since it is determined by the nozzle pitch of the recording head), only a resolution of 360 dpi as an original resolution of the printer 200a is available. Therefore, when the scan speed of the recording head is set in correspondence with a resolution of 203 dpi or 406 dpi, recording data is enlarged in only the main scan direction at an enlargement factor=×1.8 (=360÷203).

An operation for outputting recording data shown in FIG. 24 to the printer 200a will be described below with reference to the flow chart shown in FIG. 25. In the following description, the number of dots that can be recorded by the printer 200a during a single scan operation is represented by K (dots) (for example, when a recording head 90 has nozzles for 64 dots, K=64), and an original data amount corresponding to that recorded by a single scan operation of the recording head at a resolution of 203 dpi (406 dpi) is represented by J (i.e., J=K÷1.8). Therefore, when recording is performed at a resolution of 360 dpi, J=36. The resolution of the facsimile received image is set to be 203 dpi since (dpi)×36/48=202.5 dpi when 36 dots are converted to 48 dots.

In step S201, both start coordinate values Y1 (for 203 dpi) and Y2 (for 360 dpi) where image data to be processed are stored are initialized. The flow then advances to step S202 to check if data are present within J dots from the coordinate value Y1 of image data having a resolution of 203 dpi, i.e., if facsimile received image data (203 dpi) to be recorded by a single scan operation of the recording head are present. If NO in step S202, the flow advances to step S209 to check if image data (360 dpi) such as character data are present.

However, if YES in step S202, the flow advances to step S204 to check if the resolution pre-set in the printer 200a is 203 dpi or 406 dpi. If a resolution of 203 dpi is set, the flow advances to step S205, and the scan speed of the recording head of the printer 200a is set in correspondence with a resolution of 203 dpi; if a resolution of 406 dpi is set, the scan speed of the recording head of the printer is set in correspondence with a resolution of 406 dpi in step S206. When the scan speed of the recording head is determined in this manner, the flow advances to step S207, and image data for J dots from the coordinate value Y1 of the facsimile received image (203 dpi) are output to and printed by the printer 200a. At this time, when the scan speed of the recording head is set in correspondence with 406 dpi, the image data are enlarged at a×2 magnification in the subscan direction. Furthermore, as described above, the image data are enlarged at a×1.8 magnification in the main scan direction (vertical direction). The flow then advances to step S208 to return the recording head of the printer 200a to the home position by a line renewal amount=0. Thus, the facsimile received image corresponding to one scan operation of the recording head is recorded.

In step S209, it is checked if image data having a resolution of 360 dpi (wordprocessor document data) are present within K dots from the coordinate value Y2 like in the case of the facsimile received image, i.e., if data to be recorded by the next scan operation of the recording head are present. If YES in step S209, the flow advances to step S211 via step S210; otherwise, the flow advances to step S213. In step S211, the scan speed of the recording head of the printer 200a is set in correspondence with a resolution of 360 dpi, and in step S212, image data having a resolution of 360 dpi for K dots (to be recorded by one scan operation) form the coordinate value Y2 are supplied to and printed by the printer 200a. The flow then advances to step S213, and the recording head is returned by a line renewal amount=K to be located at the next recording start position. In step S214, the coordinate values Y1 and Y2 indicating the addresses of image data are updated upon being respectively incremented by J and K. In step S215, it is checked if all the data to be recorded in one page are recorded. If NO in step S215, the flow returns to step S202 to repetitively execute the above-mentioned processing.

In this flow chart, data obtained by synthesizing 203-dpi data and 360-dpi data are printed. However, data having either resolution can be printed according to this flow chart. This embodiment uses resolutions of 203 dpi, 360 dpi, and 406 dpi. However, the present invention is not limited to these.

As described above, according to the third embodiment, when the variable-speed printer, which can perform recording at different resolutions by changing the speed of the recording head, is controlled, images having different resolutions, e.g., a facsimile received image and an image created by, e.g., a wordprocessor, can be recorded with low cost without deterioration of image quality.

In each of the above embodiments, an ink jet recording system, in particular, an ink jet recording system utilizing heat energy has been exemplified. However, the present invention can be applied to any other printers as long as they perform recording by scanning recording heads. Thus, the present invention is not limited to the ink jet recording system.

In each of the above embodiments, the printer 200 (200a) is of a separate type connected through the interface cable. However, the printer may be of an integrated type with the main unit. Furthermore, the resolution of the printer 200 (200a) is set to be 360 dpi. Of course, the present invention is not limited to this. The performance of the carriage motor 31 and the ink ejection period of the printer 200 (200a) are not limited to those in the above embodiments, either.

Fourth Embodiment

The fourth embodiment of the present invention will be described below. In the fourth embodiment, a printer, which changes the scan speed in reciprocal scan operations of a recording head, will be described.

FIGS. 26a and 26b show the relationships among recorded dot positions when recording operations are performed at resolutions of 360 dpi and 200 dpi in the subscan direction.

FIG. 26a shows dots recorded at a resolution of 360 dpi, and FIG. 26b shows dots recorded at a resolution of 200 dpi. In this manner, the number of recorded points (dots) per unit length at a resolution of 200 dpi is smaller than that at a resolution of 360 dpi. In this manner, the resolution can be changed by changing the scan speed of the recording head or the ink ejection period so as to form an image.

FIG. 27 shows the relationship between the scan speed of the recording head and the ink ejection period. A scan speed V of the recording head upon recording at a resolution of 200 dpi is given by:

$$V=(360/200) \times V_0$$

where $V_0$ is the scan speed of the recording head upon recording at a resolution of 360 dpi. In this embodiment, since the driving pulse frequency of a carriage motor 31 upon recording at a resolution of 360 dpi is set to be 300 pps, the driving pulse frequency of the carriage motor 31 upon recording at a resolution of 200 dpi becomes 1.8 (=360/200) times that at 360 dpi, i.e., is set to be 540 pps.

Figure 28:
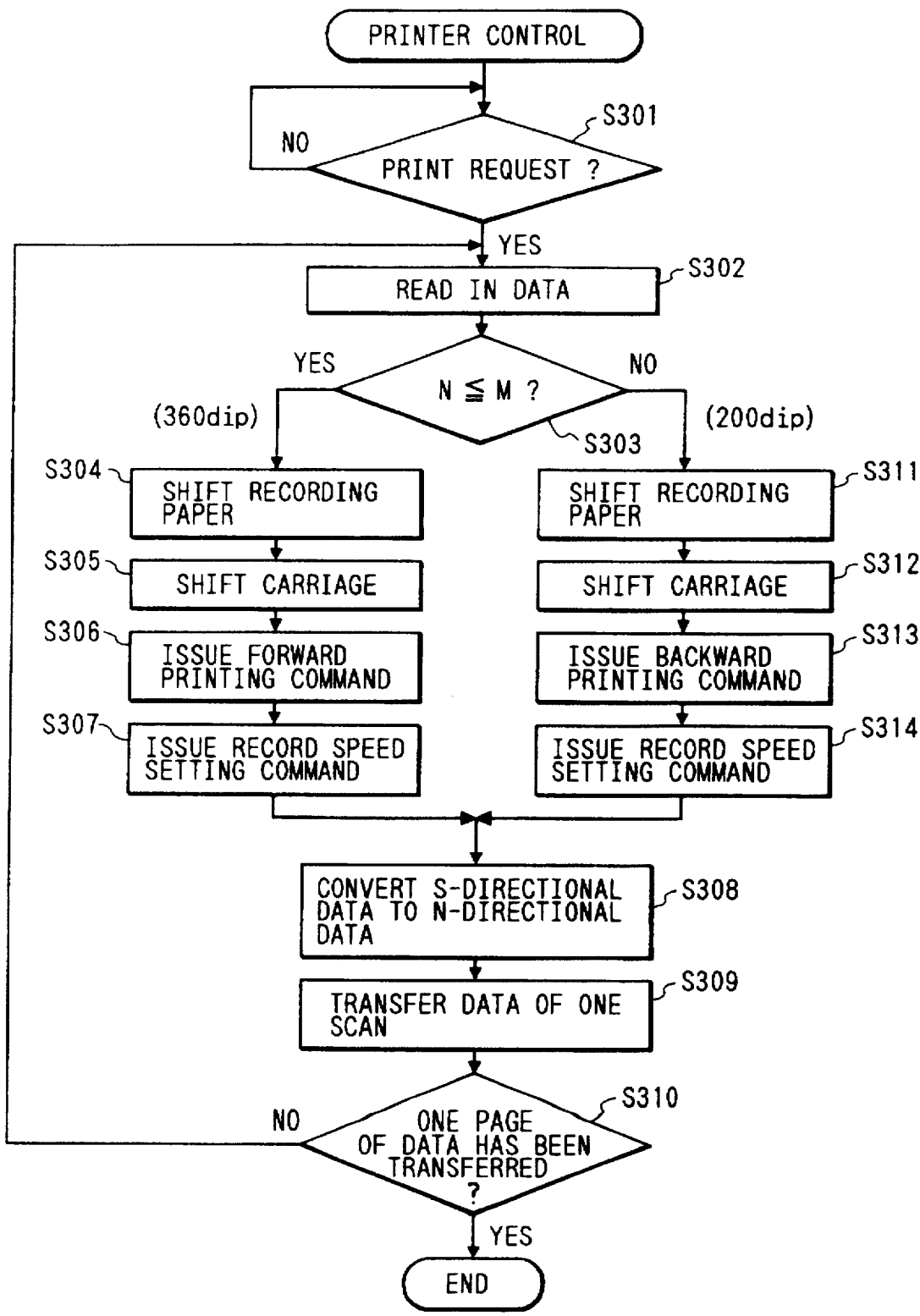
FIG. 28 is a flow chart showing an operation of a printer controller.

FIG. 28 is a flow chart showing control processing of a printer 200 in a printer controller 65. Since the control arrangement is the same as that shown in FIG. 6 described above, a detailed description thereof will be omitted.

Upon reception of a print request from an I/O controller 62 in step S301, the flow advances to step S302, and the printer controller 65 reads recording data in a data format to be described later for 64 lines from the I/O controller 62, and stores the read data in a memory. In this case, the printer controller 65 reads image data at a resolution of 200 dpi while converting the resolution of image data in the dot aligning direction (main scan direction) of the recording head from 200 dpi to 360 dpi by vertical resolution conversion to be described later. The flow then advances to step S303, data having smaller record start position data indicating a record start position is selected from the read image data, and is recorded. More specifically, if a record start position at 360 dpi is represented by N, and a record start position at 200 dpi is represented by M, when N is equal to or smaller than M, recording is started at 360 dpi. Contrary to this, when N is larger than M, recording is started at 200 dpi.

Recording at a resolution of 360 dpi as forward recording will be described below. In step S304, a feed motor 35 is driven based on the read record start position data, and recording paper is shifted to the record start position by the above-mentioned method. The flow then advances to step S305, and a carriage 110 is moved to the left end as a forward record start position. In step S306, a forward printing command is issued, and in step S307, a record speed command is issued.

Recording at a resolution of 200 dpi as backward recording will be described below. In step S311, the feed motor is driven based on the read record start position data, and recording paper is shifted to a record position. The flow advances to step S312, and the carriage 110 is moved to the right end as a backward record start position. The flow advances to step S313 to issue a backward printing command. In step S314, a record speed command is issued.

The flow advances to step S308 to execute so-called vertical-horizontal conversion of data for converting recording data stored on the memory in the main scan direction to those in the subscan direction since the nozzle array of the recording head is aligned in the subscan direction. In step S309, data for one scan period (64 lines) are transferred to the printer 200. In step S310, it is checked if data for one page are transferred. If YES in step S310, the processing is ended. However, if NO in step S310, the flow returns to step S302 to execute the above-mentioned processing.

Since the data formats of recording data (image data) of this embodiment are the same as those shown in FIGS. 19a and 19b described in the second embodiment, a detailed description thereof will be omitted.

More specifically, to summarize this embodiment, when a printer having a basic resolution of 360 dpi outputs an image at a resolution of 200 dpi, in the horizontal direction, i.e., in the subscan direction (S-direction), resolution conversion is executed by increasing the scan speed of the recording head to 1.8 times=360/200, and in the main scan direction, the resolution is converted to 360 dpi by an interpolation operation, as shown in FIGS. 21a and 21b. In a forward printing operation for one line including 64 dots, the recording head is set to have a normal scan speed to perform recording at 360 dpi. In a backward printing operation, the scan speed of the recording head is increased to 1.8 times to perform recording at a resolution of 200 dpi. Upon execution of this control, for example, both document data having a resolution of 360 dpi and image data having a resolution of 200 dpi can be recorded in a single line.

In this embodiment, 360-dpi recording is performed in the forward printing operation, and 200-dpi recording is performed in the backward printing operation. However, contrary to this, if 200-dpi recording is performed in the forward printing operation, and 360-dpi recording is performed in the backward printing operation, the same effects can be obtained.

In this embodiment, 200-dpi image data is recorded by the 360-dpi printer. However, at other resolutions, the same effect can be obtained by the same control.

When data having different resolutions (e.g., 360 dpi and 200 dpi) are to be output, the scan speed of the recording head is changed and the ink ejection period is fixed so as to form an image. Alternatively, the scan speed of the recording head may be fixed, and the ink ejection period may be changed.

As described above, according to this embodiment, data having two different resolutions in a single recording line to be recorded are respectively assigned to forward and backward recording operations, and the speed of, the recording head is changed between the forward and backward recording operations in correspondence with the recording resolution. Thus, image data having different resolutions can be recorded in a single recording line with high quality.

Fifth Embodiment

The fifth embodiment of the present invention will be described below. In the fifth embodiment, a printer, which performs density correction and smoothing processing upon resolution conversion, will be described. Since the control arrangement is the same as that shown in FIG. 6, a detailed description thereof will be omitted.

Figure 29:
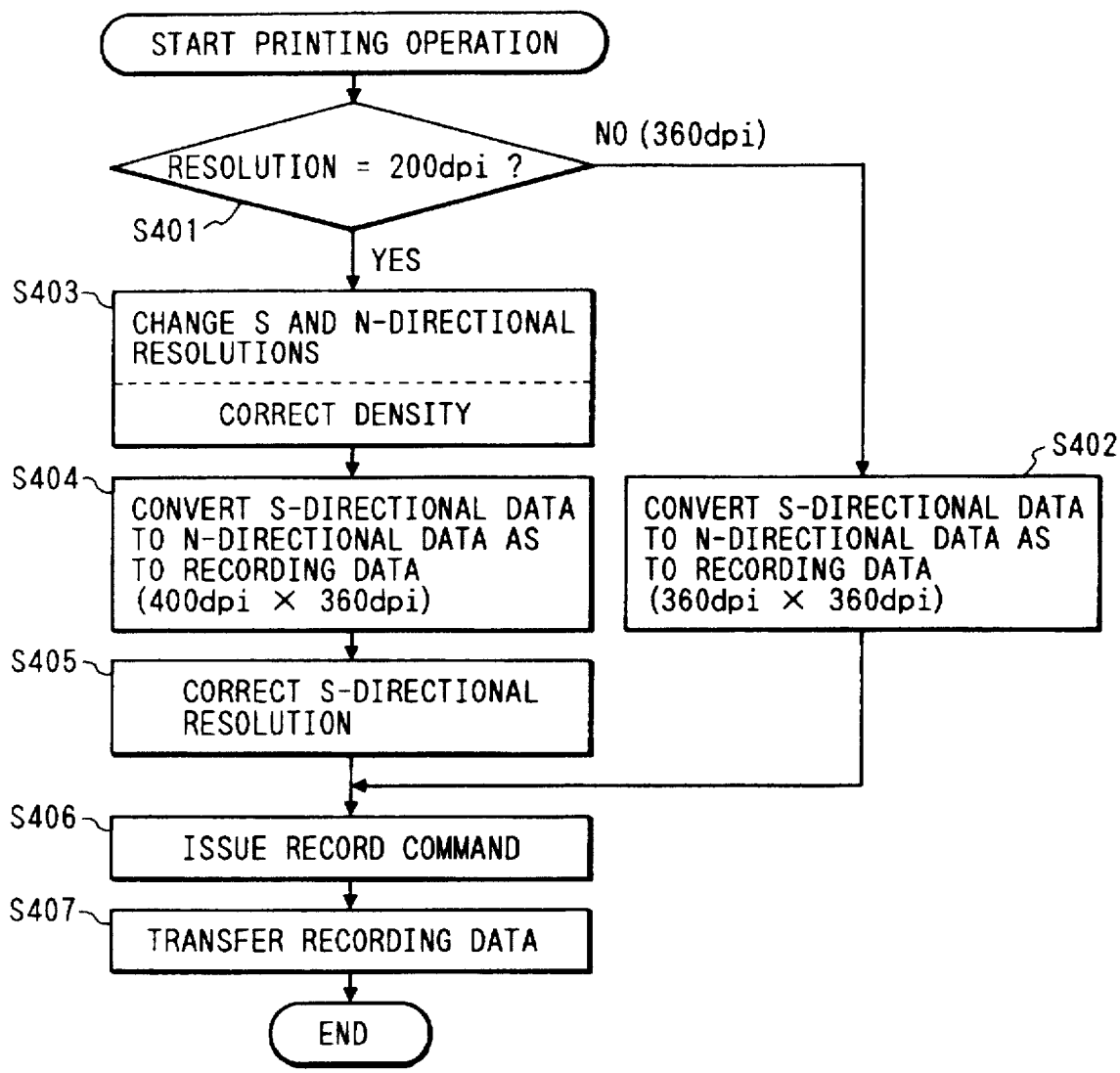
FIG. 29 is a flow chart showing image data conversion processing in the printer controller of the third embodiment.

FIG. 29 is a flow chart showing printer control processing in a printer controller 65. The printer controller 65 performs various conversion processing operations of image data so as to output image data sent from an I/O controller 62 and having a resolution of 200 dpi to an ink jet printer 200 having a resolution of 360 dpi with high quality.

These processing operations will be briefly described below. When the resolution of recording data (image data) is the same as that (360 dpi) of the printer 200, the recording data need only be subjected to vertical-horizontal conversion to be matched with the recording order of a recording head IJH. However, when the resolution of recording data is different from that of the printer 200, for example, is 200 dpi, the recording data is temporarily expansion-converted to a resolution of 400 dpi. In this case, in order to correct an increase in density of a recorded image upon resolution correction in the subscan direction to be executed later, density correction and smoothing processing of the recording data is performed. Then, resolution correction for converting the resolution in the main scan direction of the printer 200 to 360 dpi, and recording data vertical-horizontal conversion for aligning image data to coincide with the alignment of 64 dots in the N-direction of the recording head are performed. In order to convert the resolution in the subscan direction of the printer 200 to 400 dpi, the rotational speed of a carriage motor 31 for scanning the recording head in the S-direction is controlled. These processing operations are shown in the flow chart of FIG. 29.

In step S401, when recording data and its resolution data are supplied from the I/O controller 62, the resolution is discriminated. More specifically, in this case, it is checked if the recording data is facsimile received image data having a resolution of 200 dpi or document data created by a word-processor having a resolution of 360 dpi. If it is determined in step S401 that the recording data is the facsimile received image data having a resolution of 200 dpi, the flow advances to step S403, and resolution expansion conversion for converting the S-directional (subscan) resolution to 400 dpi, and converting the N-directional (main scan) resolution to 360 dpi is performed so as to output the image data to the 360-dpi printer. At this time, furthermore, in order to correct an increase in density of a recorded image upon resolution correction in the subscan direction to be executed later, density correction is performed. The flow then advances to step S404, and vertical-horizontal conversion of the resolution-converted recording data is performed. In step S405, resolution correction in the S-direction (subscan direction) is performed.

On the other hand, if the recording data is the document data created by the wordprocessor and having a resolution of 360 dpi, since no resolution conversion is required, the flow advances to step S402, and only vertical-horizontal conversion of 360 dpi×360 dpi image data is performed like in step S404.

The flow then advances to step S406. In step S406, a record command corresponding to the recording data converted in step S402 or in step S403 to S405 is issued, and the recording data is transferred to the printer 200 together with the record command (step S407).

The image data conversion processing method in steps S403 to S405 in the flow chart shown in FIG. 29 will be described in detail below.

In order to output input image data having a subscan (S-directional) resolution of 200 dpi and a main scan (N-directional) resolution of 200 dpi to the 360 dpi×360 dpi printer 200, the S-directional resolution is converted to 400 dpi, and the N-directional resolution is converted into 360 dpi. In this resolution conversion processing, the S-directional resolution is set to be 400 dpi, and in the subscan (S-direction) resolution correction executed in step S405, the rotational speed of the carriage motor 31 is changed to a speed 360/400 (9/10) that in a 360-dpi recording operation. Thus, recording is performed at a subscan image resolution of 400 dpi. With this control, omission of information or image distortion caused by thinning out of dots in the subscan direction can be prevented. However, since the subscan dot density becomes (400/360) times that in the main scan direction, the density of an output image is undesirably increased. For this reason, as described above, in the processing in step S403, density correction is performed. The density correction will be described below.

FIGS. 30a to 30c show the relationships among dots recorded at resolutions of 360 dpi and 400 dpi.

FIG. 30a shows a case wherein dots are aligned at every other positions at a resolution of 360 dpi, and FIG. 30b shows a case wherein dots are aligned at every other positions at a resolution of 400 dpi. In this case, since the recording area per dot remains the same, the dot pitch in FIG. 30b is smaller that in FIG. 30a, and the space factor of dots per unit recording area in FIG. 30b is larger than that in FIG. 30a. Since a dot is recorded by the ink jet printer by ejecting an ink droplet, each dot is circular. As shown in FIG. 30c, the circular dot has an area about 1.5 times an actual expected recording area S, and the recording area ratio is slightly increased in a normal recording operation at a resolution of 360 dpi.

As a result, the entire recorded image becomes dark, and this especially poses a serious problem in an image recording operation in the subscan direction at a resolution of 400 dpi. In order to correct such an increase in density of a recorded image, density correction based on dot control is performed simultaneously when the S-directional resolution is converted to 400 dpi and the N-directional resolution is converted to 360 dpi in step S403.

FIGS. 31a and 31b are views for the conversion method of converting the main scan (N-directional) resolution of the recording data to 360 dpi, and converting the subscan (S-directional) resolution to 400 dpi. FIGS. 31a and 31b do not illustrate dot correction based on dot control, which is performed simultaneously when a resolution of 200 dpi is converted to a resolution of 360 dpi.

FIG. 31a shows image data having a resolution of 200 dpi. In FIG. 31a, image data is expressed by dots aligned in the vertical direction (N-direction) from the first line to the tenth line. Numbers added to the dots represent the order of lines. For example, "1" represents a dot of the first line; "2", a dot of the second line, . . . , "10", a dot of the tenth line. FIG. 31B shows a state wherein this dot string in the N-direction is converted into image data having a resolution of 360 dpi.

In FIG. 31b, the dot "1" of the first line is converted into four dots "1a", "1b", "1c", and "1d", and the dot "2" is similarly converted into four dots "2a" to "2d". Each of the dots "3", "4", and "6" to "9" is similarly converted into four dots. Each of the dots "5" and "10" is converted into two dots, i.e., "5a" and "5b" and "10a" and "10b". Consequently, as shown in FIGS. 31a and 31b, the 10 dots "1" to "10" of image data having a resolution of 200 dpi are enlarged to 1.8 times, i.e., 18 dots (360 dpi) in the N-direction (main scan direction), and are resolution-converted to twice, i.e., two dots (400 dpi) in the S-direction. Therefore, an N-directional resolution RN after conversion is:

$$25.4/200 \times 10 = 25.4/R_N \times 18$$

$$\therefore R_N = 360 (dpi)$$

An S-directional resolution $R_s$ is:

$$25.4/200 \times 1 = 25.4/R_s \times 2$$

$$\therefore R_s = 400 (dpi)$$

This conversion is performed in both the S- and N-directions within a range where image data are present. Finally, A4-size 200×200 (dpi) image data are converted into 400×360 (dpi) image data.

The density correction performed simultaneously with this resolution conversion will be described below.

A case wherein one dot is converted into four dots like the dots "1" to "4" and "6" to "9" in FIG. 31a will be referred to as a 1–4 converted pattern hereinafter, and a case wherein one dot is converted into two dots like the dots "5" and "10" will be referred to as a 1–2 converted pattern hereinafter.

Figure 32:
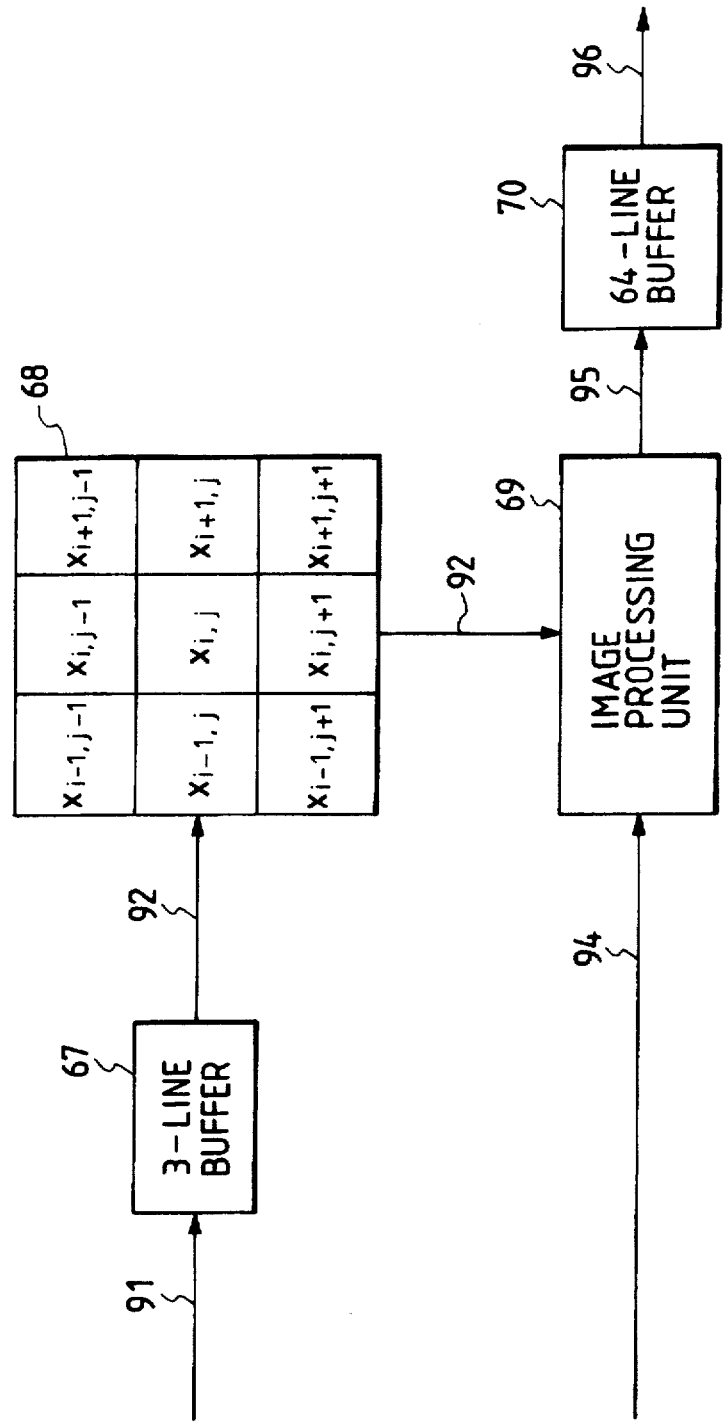
FIG. 32 is a block diagram showing an arrangement of a processing unit for performing resolution conversion and density correction in step S3 of FIG. 29.

FIG. 32 is a block diagram of a processing unit for executing the above-mentioned resolution conversion and density correction (processing in step S403). In this embodiment, this processing unit is arranged in the printer controller 65 shown in FIG. 6. This processing unit may be arranged in the printer controller 34 in the printer 200 shown in FIG. 13, as a matter of course.

A line buffer 67 comprises, e.g., a dynamic RAM, and can store image data 91 for three lines input from a CPU 71. A 3×3 matrix extraction unit 68 extracts 3×3 pixels consisting of a pixel $x_{i,j}$ under consideration and surrounding eight pixels, i.e., a total of nine pixels, from a bit image 92 input from the line buffer 67. An image processing unit 69 processes an image 93 extracted by the 3×3 matrix extraction unit 68 to generate recording pixels 95. A buffer 70 temporarily stores recording data to output the recording pixels 95 processed by the image processing unit 69 to a printer, and can store image data (recording data) for 64 lines.

When A4-size image data 91 is supplied to the line buffer 67, the image data stored in the line buffer 67 is extracted in units of nine pixels by the 3×3 matrix extraction unit 68, and the extracted pixels are output to the image processing unit 69. The image processing unit 69 executes resolution conversion and density correction processing of the nine pixel data to convert the central pixel ($x_{i,j}$) of the 3×3 matrix into 4-dot or 2-dot (pixels corresponding to an integer multiple of 5) recording pixels, as has been described above with reference to FIGS. 31A and 31B. When this operation is sequentially performed, the A4-size image data can be converted.

FIG. 33 is a flow chart showing the image conversion processing in the image processing unit 69. Image data in the 3×3 matrix is processed according to this flow chart, thereby generating a recording image.

The image data in the 3×3 matrix is converted into one of recording pixels 111 to 118 in FIG. 34B or 34C according to a pixel pattern in the 3×3 pixel matrix, i.e., a corresponding one of eight patterns ① to ⑧ shown in FIG. 34A. FIG. 34B shows 1–4 converted patterns, and FIG. 34C shows 1–2 converted patterns.

As shown in FIG. 34A, nine pixels $x_{i-1,j-1}$, $x_{i,j-1}$, $x_{i+1,j-1}$, $x_{i-1,j}$, $x_{i+1,j}$, $x_{i-1,j+1}$, $x_{i,j+1}$, and $x_{i+1,j+1}$ extracted as the 3×3 matrix are classified into one of the patterns ① to ⑧ according to the pixel pattern. According to one of these patterns ① to ⑧, the pixel $x_{i,j}$ under consideration is converted into four pixels $x_{ij1}$ to $x_{ij4}$ in the 1–4 converted pattern (FIG. 34B), and is converted into two pixels $x_{ij1}$ and $x_{ij2}$ in the 1–2 converted pattern (FIG. 34C). In the 3×3 pixel matrix as each of the patterns ① to ⑧ in FIG. 34A, "□" indicates a non-converted white pixel, "■" indicates a non-converted black pixel, and "□" filled with "x" indicates a non-converted white or black pixel.

In FIGS. 34B and 34C, "□" indicates a converted white pixel, and "■" indicates a converted black pixel. For example, in the 1–4 converted patterns in FIG. 34B, in the 3×3 matrix pattern ① in which black pixels are arranged obliquely upward to the right, the pixel $x_{i,j}$ under consideration constitutes recording pixels by three dots $x_{ij2}$, $x_{ij3}$, and $x_{ij4}$, as indicated by the converted pattern 111 in FIG. 34B.

Therefore, the two pixels $x_{i+1,j-1}$ and $x_{i-1,j+1}$ can be prevented from being disconnected, and a corner of an oblique line is rounded to obtain a smooth line. Similarly, in each of the patterns ② to ⑧, since an operation for omitting a recording pixel at the white pixel side in place of that at the adjacent black pixel side is performed, a smooth line can be recorded and reproduced while maintaining connections among pixels. Furthermore, in the case of patterns other than ① to ⑧, since the pixel $x_{i,j}$ under consideration is simply converted to 2×2 pixels, deterioration of an image caused by omission of dots can be prevented even in a solid black pattern.

Since the above-mentioned density correction processing is performed by processing oblique lines using patterns, it can also provide a smoothing effect for converting characters or figures into smooth ones. Therefore, non-converted image data having a resolution of 200 dpi is not only merely converted into image data matching with a dot density having a resolution of 360 dpi, but also converted into high-resolution image data having a resolution of 360 dpi, thus recording a high-quality image.

Image data subjected to the above-mentioned resolution conversion and having a resolution of 400 dpi×360 dpi are transferred in units of blocks each including 64 dots in the N-direction in correspondence with the serial recording output of the ink jet printer 200. For this purpose, the image data is then subjected to the above-mentioned vertical-horizontal conversion.

A method of recording data at a resolution of 400 dpi in the subscan direction (S-direction) will be described below with reference to FIGS. 35a to 35c.

Figure 35:
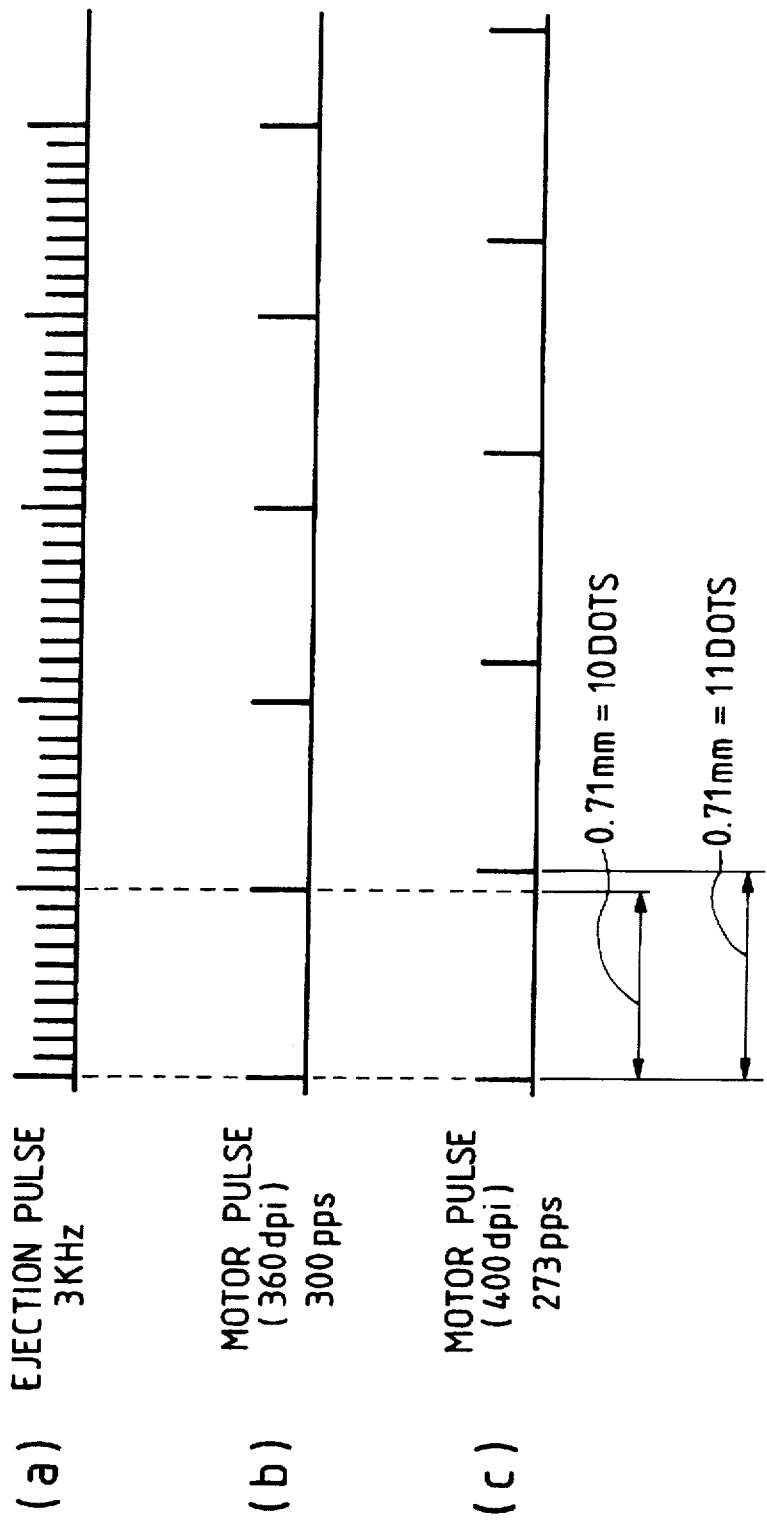
FIGS. 35(a) to 35(c) are charts showing the relationship between the ejection pulses for ejecting ink droplets from nozzles of a recording head of the printer and the driving pulses for driving a carriage motor.

FIGS. 35a to 35c show the relationship between ejection pulses for ejecting ink droplets from nozzles of the recording head of the printer 200, and driving pulses for driving the carriage motor 31.

FIG. 35a shows the ejection pulses for ink droplets ejected from the recording head IJH in synchronism with the scan operation of a carriage 110 in the S-direction. One ink droplet is ejected in response to one ejection pulse, and one dot image is formed on a recording sheet surface. The frequency of the ejection pulses is 3 kHz, and 3,000 dots per second can be recorded. FIG. 35b shows the driving pulses of the carriage motor 31 upon recording at a resolution of 360 dpi. The carriage 110 (recording head IJH) is moved by 0.71 mm in response to each pulse. Since 10 ejection pulses are output between adjacent output timings of the driving pulses, 10 dot images (pixels) can be recorded in a recording length of 0.71 mm. At this time, the driving speed of the carriage motor 31 is 300 pps.

FIG. 35c shows the driving pulses of the carriage motor 31 when image data having a resolution of 400 dpi is recorded by scanning the carriage 110 in the S-direction. In this case, to achieve a resolution of 400 dpi, 11 dots must be recorded while the carriage 110 is moved by 0.71 mm. Since the ejection pulse period for ejecting the ink from the recording head IJH is constant (3 kHz), the driving pulses of the carriage motor 31 are changed to 273 pps to decrease the scan speed of the recording head IJH, thereby increasing the density of recorded dots per unit recording length.

Figure 36A:
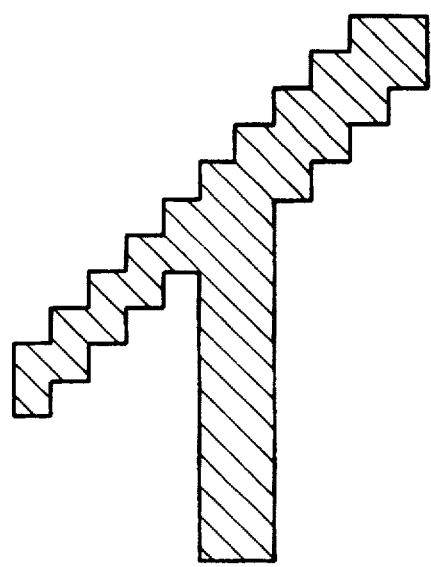
FIGS. 36(A) and 36(B) are views showing images recorded by the printer of the system of the third embodiment.
Figure 36B:
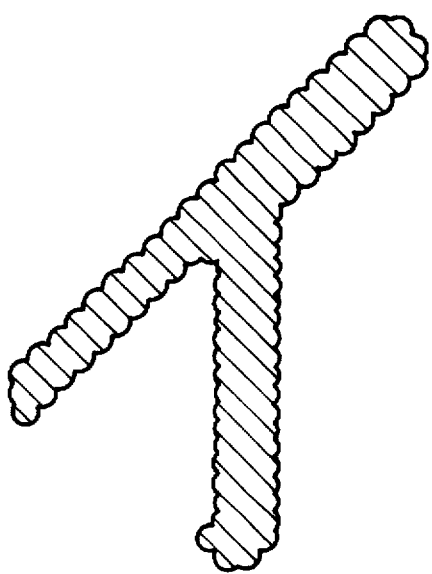
Figure 37A:
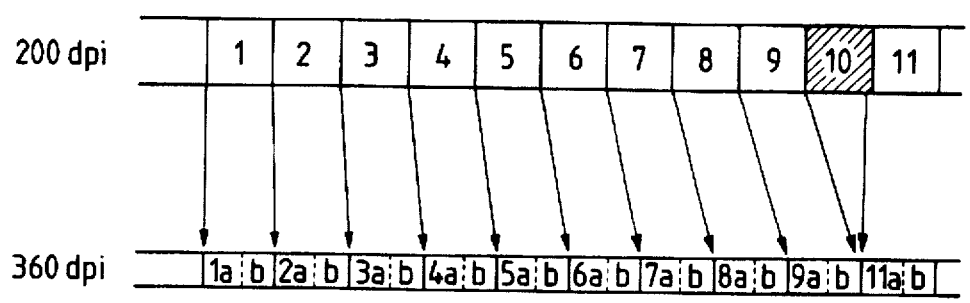
FIGS. 37A to 37C are views showing conventional resolution conversion of image data.
Figure 37B:
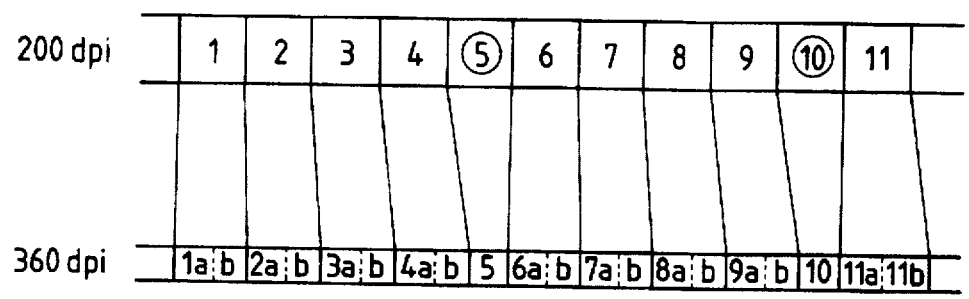
Figure 37C:
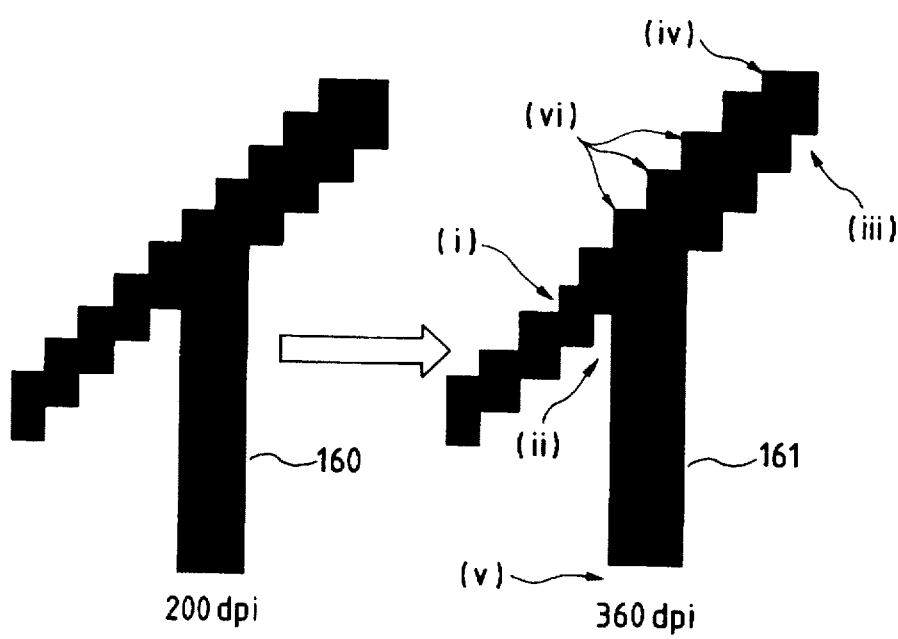

FIGS. 36A and 36B show images recorded after the above-mentioned density correction processing.

FIG. 36A shows an image recorded based on image data before the density conversion, and having a resolution of 200 dpi, and FIG. 36B shows a recorded image subjected to the density conversion and having a resolution of 400×360 dpi. In FIG. 36B, since the image is recorded by an ink jet printer, each recorded dot is circular.

As described above, according to this embodiment, when a low-resolution image is recorded using a high-resolution printer, the image data is resolution-converted, and in this case, the arrangement of converted pixels is determined according to the condition of surrounding pixels, thus recording a high-quality image free from image distortion.

When the resolution is changed by changing the scan speed of the recording head, original image data can be converted without thinning processing, and a uniform interpolation operation can also be performed. Thus, a high-resolution smoothed image free from image distortion can be recorded.

In this embodiment, the printer 200 has been described as the ink jet printer. However, the present invention is not limited to this. A recording system is not particularly limited as long as a serial printer is used. The printer 200 is of a separate type connected through the interface cable, but may be of an integrated type.

In this embodiment, image data to be processed has been described as a 200-dpi facsimile received image and a 360-dpi document image. However, the types and resolutions of image data are not limited to those in this embodiment.

The converted patterns for the density correction shown in FIGS. 34A to 34C are not limited to those in this embodiment. For example, optimal patterns may be generated or selected according to the characteristics of a printer to be used, a resolution to be converted, and the like.

The present invention can be applied to either a system constituted by a plurality of devices or an apparatus consisting of a single device. The present invention can also be applied to a case wherein the invention is achieved by supplying a program for executing this invention to the system or the apparatus.

The present invention brings about excellent effects particularly in a recording head and a recording device of the ink jet system using a thermal energy among the ink jet recording systems.

As to its representative construction and principle, for example, one practiced by use of the basic principle disclosed in, for instance, U.S. Pat. Nos. 4,723,129 and 4,740,796 is preferred. The above system is applicable to either one of the so-called on-demand type and the continuous type. Particularly, the case of the on-demand type is effective because, by applying at least one driving signal which gives rapid temperature elevation exceeding nucleus boiling corresponding to the recording information on electrothermal converting elements arranged in a range corresponding to the sheet or liquid channels holding liquid (ink), a heat energy is generated by the electrothermal converting elements to effect film boiling on the heat acting surface of the recording head, and consequently the bubbles within the liquid (ink) can be formed in correspondence to the driving signals one by one. By discharging the liquid (ink) through a discharge port by growth and shrinkage of the bubbles, at least one droplet is formed. By making the driving signals into pulse shapes, growth and shrinkage of the bubble can be effected instantly and adequately to accomplish more preferably discharging of the liquid (ink) particularly excellent in accordance with characteristics. As the driving signals of such pulse shapes, the signals as disclosed in U.S. Pat. Nos. 4,463,359 and 4,345,262 are suitable. Further excellent recording can be performed by using the conditions disclosed in U.S. Pat. No. 4,313,124 of the invention concerning the temperature elevation rate of the above-mentioned heat acting surface.

As a construction of the recording head, in addition to the combined construction of a discharging orifice, a liquid channel, and an electrothermal converting element (linear liquid channel or right angle liquid channel) as disclosed in the above specifications, the construction by use of U.S. Pat. Nos. 4,558,333 and 4,459,600 disclosing the construction having the heat acting portion arranged in the flexed region is also included in the invention. The present invention can be also effectively constructed as disclosed in JP-A-59-123670 which discloses the construction using a slit common to a plurality of electrothermal converting elements as a discharging portion of the electrothermal converting element or JP-A-59-138461 which discloses the construction having the opening for absorbing a pressure wave of a heat energy corresponding to the discharging portion.

What is claimed is:

1. A recording apparatus for recording an image on a recording medium by scanning a recording head, comprising:

scan means for scanning said recording head by changing a scan speed of said recording head;

record means for recording by changing a driving frequency of said recording head; and control means for controlling said scan means and said recording means to change the scan speed and the driving frequency of said recording head, respectively, according to a resolution of image data to be recorded by said recording head so as to perform recording, so that images having different resolutions can be recorded on a single line, said control means determining the scan speed of said recording head according to a frequency characteristic of a motor for moving said recording head, wherein said control means controls said scan means and said recording means in such a manner that the driving frequency is high and the scan speed is low when the resolution of image data is high while the driving frequency is low and the scan speed is high when the resolution of image data is low.

2. An apparatus according to claim 1, wherein said control means determines the scan speed of said recording head according to a ratio of the resolution of the image data to an original resolution of said recording apparatus.

3. An apparatus according to claim 1, wherein said control means determines the driving frequency of said recording head according to a ratio of the resolution of the image data to an original resolution of said recording apparatus.

4. An apparatus according to claim 1, wherein upper and lower limit values of the driving frequency of said recording head are determined based on a recording dot size or a recording dot shape.

5. A recording control apparatus for controlling a recording apparatus for recording an image on a recording medium by scanning a recording head, wherein said recording apparatus comprises recording means for performing recording by changing a scan speed of said recording head and a driving frequency of said recording head, comprising:

discrimination means for discriminating a resolution of image data to be recorded by said recording apparatus; and control means for controlling to perform recording by changing the scan speed and the driving frequency of said recording head of said recording apparatus according to the resolution discriminated by said discrimination means, so that images having different resolutions can be recorded on a single line, said control means determining the scan speed of said recording head according to a frequency characteristic of a motor for moving said recording head, wherein said control means controls said scan means and said recording means in such a manner that the driving frequency is high and the scan speed is low when the resolution of image data is high while the driving frequency is low and the scan speed is high when the resolution of image data is low.

6. A recording apparatus for receiving recording data, and recording an image based on the recording data on a recording medium by scanning a recording head with a scan speed, the scan speed being variable, comprising:

pitch changing means for changing a recording pitch in a scan direction of said recording head by changing a frequency for driving said recording head On the basis of the recording data:

discrimination means for discriminating a resolution switching position in image data to be recorded by a single scan operation of said recording head; and controlling means for controlling said pitch changing means according to the discrimination result of said discrimination means, so that images having different resolutions can be recorded on a single line, said control means determining the scan speed of said recording head according to a frequency characteristic of a motor for moving said recording head.

7. An apparatus according to claim 6, wherein said discrimination means discriminates the resolution switching position on the basis of resolution designation information added to the input recording data.

8. A recording apparatus for receiving recording data, and recording an image based on the recording data on a recording medium by scanning a recording head with a scan speed, the scan speed being variable, comprising:

pitch changing means for changing a recording pitch in a scan direction of said recording head by changing a scan speed of said recording head;

discrimination means for discriminating a resolution switching position in image data to be recorded by a single scan operation of said recording head; and controlling means for controlling said pitch changing means according to the discrimination result of said discrimination means, so that images having different resolutions can be recorded on a single line, said control means determining the scan speed of said recording head according to a frequency characteristic of a motor moving said recording head.

9. An apparatus according to claim 8, wherein said discrimination means discriminates the resolution switching position on the basis of resolution designation information added to the input recording data.

10. An apparatus according to claim 8, further comprising means for, when the scan speed of said recording head is changed by said pitch changing means, and when a distance between a current recording position and a start position of a target image to be recorded by changing the pitch is shorter than a moving distance of said recording head until a scan speed upon recording of the target image is reached, moving said recording head in a reverse direction by at least the moving distance from the start position of the target image.

11. A recording control apparatus for controlling a recording apparatus capable of performing recording by changing a resolution by changing a scan speed of a recording head, comprising:

first recording means for recording recording data having a first resolution by scanning said recording head at a first speed;

second recording means for recording recording data having a second resolution different from the first resolution by scanning said recording head at a second speed; and control means for, when recording data having different resolutions are recorded on a single scan line, controlling to perform recording by scanning said recording head a plurality of number of times on the scan line.

12. An apparatus according to any one of claims 1–2 or 3–11, wherein said recording head comprises an ink jet recording head for performing recording by ejecting an ink.

13. An apparatus according to claim 12, wherein said recording head is a recording head for ejecting an ink by utilizing heat energy, and comprises heat energy converting elements for generating heat energy to be applied to the ink.

14. A recording apparatus according to claim 1, wherein said recording apparatus is employed in a copying machine.

15. A recording apparatus according to claim 1, wherein said recording apparatus is employed in a facsimile machine.

16. A recording apparatus according to claim 1, wherein said recording apparatus is employed in a data processing apparatus.

17. A recording apparatus according to claim 1, further comprising conveying means for conveying the recording medium.

18. A recording apparatus according to claim 1, further comprising recovery means for recovering the recording head.

19. A recording apparatus according to claim 6, wherein said recording apparatus is employed in a copying machine.

20. A recording apparatus according to claim 6, wherein said recording apparatus is employed in a facsimile machine.

21. A recording apparatus according to claim 6, wherein said recording apparatus is employed in a data processing apparatus.

22. A recording apparatus according to claim 6, further comprising conveying means for conveying the recording medium.

23. A recording apparatus according to claim 6, further comprising recovery means for recovering the recording head.

24. A recording apparatus according to claim 8, wherein said recording apparatus is employed in a copying machine.

25. A recording apparatus according to claim 8, wherein said recording apparatus is employed in a facsimile machine.

26. A recording apparatus according to claim 8, wherein said recording apparatus is employed in a data processing apparatus.

27. A recording apparatus according to claim 8, further comprising conveying means for conveying the recording medium.

28. A recording apparatus according to claim 8, further comprising recovery means for recovering the recording head.

29. A printer apparatus for recording an image on a recording medium by scanning a recording head, comprising:

scan means capable of scanning said recording head by changing a scan speed of said recording head;

recording means capable of performing recording by changing a driving frequency of said recording head; and control means for controlling to change at least one of the scan speed and the driving frequency according to a resolution of recording data in forward and backward paths of said recording head, so that images having different resolutions can be recorded on a single line.

30. An apparatus according to claim 29, wherein the resolution of the recording data is discriminated by resolution information included in the recording data.

31. An apparatus according to claim 29, wherein said recording head ejects an ink.

32. An apparatus according to claim 31, wherein said recording head comprises a plurality of ejection orifices for ejecting the ink, and heat energy generating means, arranged in correspondence with the ejection orifices, for causing a change in state due to heat in the ink, ejecting the ink from the ejection orifices on the basis of the change in state, and forming flying droplets.

33. A printer apparatus according to claim 29, wherein said recording apparatus is employed in a copying machine.

34. A printer apparatus according to claim 29, wherein said recording apparatus is employed in a facsimile machine.

35. A printer apparatus according to claim 29, wherein said recording apparatus is employed in a data processing apparatus.

36. A printer apparatus according to claim 29, further comprising conveying means for conveying the recording medium.

37. an apparatus according to claim 29, further comprising recovery means for recovering the recording head.

38. A printer controller for controlling a printer for recording an image on a recording medium on the basis of image data by scanning a recording head, comprising:

scanning means for scanning said recording head with a scan speed, the scan speed of said recording head being variable;

conversion means for receiving the image data, and for, when a resolution of the image data is different from a resolution of said printer, converting a dot density of the image data, and determining a pixel pattern of the dot density-converted image data based on a pixel pattern near a pixel under consideration of the input image data; and controlling means for controlling said scan means to vary the scan speed of said recording head according to the dot density-converted image data by said conversion means so as to perform recording, said control means determining the scan speed of said recording head according to a frequency characteristic of a motor for moving said recording head.

39. A controller according to claim 38, wherein said conversion means converts the resolution of the input image data within a range of resolutions near the resolution of said printer, and allowing easy conversion without requiring thinning processing of the image data.

40. A controller according to claim 38, wherein said recording head ejects an ink.

41. A controller according to claim 40, wherein said recording head comprises a plurality of ejection orifices for ejecting the ink, and heat energy generating means, arranged in correspondence with the ejection orifices, for causing a change in state due to heat in the ink, ejecting the ink from the ejection orifices on the basis of the change in state, and forming flying droplets.

42. A recording method for recording an image on a recording medium based on image data by scanning a recording head, comprising the steps of:

discriminating a resolution of the image data to be recorded by said recording head;

scanning said recording head at a scan speed determined according to the discriminated resolution, said scan speed of said recording head being determined according to a frequency characteristic of a motor for moving said recording head; and driving said recording head upon scanning of said recording head, wherein said scanning step further comprises the steps of scanning one line by one scan operation, and scanning said recording head with the scan speed which is chosen according to the resolution during the scan operation, and thereby performing recording at the discriminated resolution, so that images having different resolutions can be recorded on a single line.

43. A recording method for recording an image on a recording medium based on image data by scanning a recording head, comprising the steps of:

discriminating a resolution of the image data to be recorded by said recording head;

scanning said recording head at a scan speed according to the discriminated resolution; and driving said recording head upon scanning of said recording head, wherein said scanning step further comprises the steps of scanning one line by a plurality of scan operations, and scanning said recording head at different scan speeds according to the resolution in the plurality of scan operations, and thereby performing recording at the discriminated resolution.

44. A recording method for recording an image on a recording medium based on image data by scanning a recording head, comprising the steps of:

discriminating a resolution of the image data to be recorded by said recording head;

scanning said recording head at a scan speed determined according to the discriminated resolution, said scan speed of said recording head being determined according to a frequency characteristic of a motor for moving said recording head; and driving said recording head upon scanning of said recording head, wherein said driving step comprises the step of driving said recording head at a driving frequency determined according to the discriminated resolution, so that images having different resolutions can be recorded on a single line, and wherein when the resolution of image data is of a first degree, the driving frequency in said driving step is controlled to be of a first value and the scan speed in said scanning step is controlled to be of a first level, while when the resolution of image data is of a second degree smaller than the first degree, the driving frequency in said driving step is controlled to be of a second value lower than the first value and the scan speed in said scanning step is controlled to be of a second level higher than the first value, thereby performing recording at the discriminated resolution.

45. A method according to any of claims 42, 43 or 44, wherein the plurality of scan operations are performed in different directions.

46. A method according to any of claims 42, 43 or 44, wherein the plurality of scan operations are performed in the same direction.

47. A method according to any of claims 42, 43 or 44, wherein said recording head comprises an ink jet recording head for performing recording by ejecting an ink.

48. A method according to claim 47, wherein said recording head is a recording head for ejecting an ink by utilizing heat energy, and comprises heat energy converting elements for generating heat energy to be applied to the ink.

49. A recording method for recording an image on a recording medium based on image data by scanning a recording head, comprising the steps of:
- discriminating a resolution of the image data to be recorded by said recording head;
- scanning said recording head at a scan speed, said scan speed of said recording head being determined according to a frequency characteristic of a motor for moving said recording head;
- driving said recording head at a driving frequency determined according to the discriminated resolution upon scanning of said recording head,
- wherein said driving step comprises the steps of scanning one line by one scan operation, and driving said recording head at the driving frequency determined according to the discriminated resolution during the scan operation thereby performing recording at the resolution, so that images having different resolutions can be recorded on a single line.

50. A recording method for recording an image on a recording medium based on image data by scanning a recording head, comprising the steps of:
- discriminating a resolution of the image data to be recorded by said recording head;
- scanning said recording head;
- driving said recording head at a driving frequency according to the discriminated resolution upon scanning of said recording head,
- wherein said driving step comprises the steps of scanning one line by a plurality of scan operations, and driving said recording head at different driving frequencies according to the resolution during the plurality of scan operations, thereby performing recording at the resolution.

51. A method according to any of claims 49 or 50, wherein the plurality of scan operations are performed in the same direction.

52. A method according to any of claims 49 or 50, wherein the plurality of scan operations are performed in different directions.

53. A method according to any of claims 49 or 50, wherein said recording head comprises an ink jet recording head for performing recording by ejecting an ink.

54. A method according to claim 53, wherein said recording head is a recording head for ejecting an ink by utilizing heat energy, and comprises heat energy converting elements for generating heat energy to be applied to the ink.

* * * * *

UNITED STATES PATENT AND TRADEMARK OFFICE
CERTIFICATE OF CORRECTION

PATENT NO. : 5,788,385

DATED : August 4, 1998

INVENTOR(S): NAOSHI INOUE, ET AL.

It is certified that error appears in the above-identified patent and that said Letters Patent is hereby corrected as shown below:

Item [54], IN THE TITLE

"VARING" should read --VARYING--.

COLUMN 1, IN TITLE

Line 2, "VARING" should read --VARYING--.

COLUMN 2

Line 20, "despite it is" should read --despite the fact that it is--.

COLUMN 4

Figure 25B:
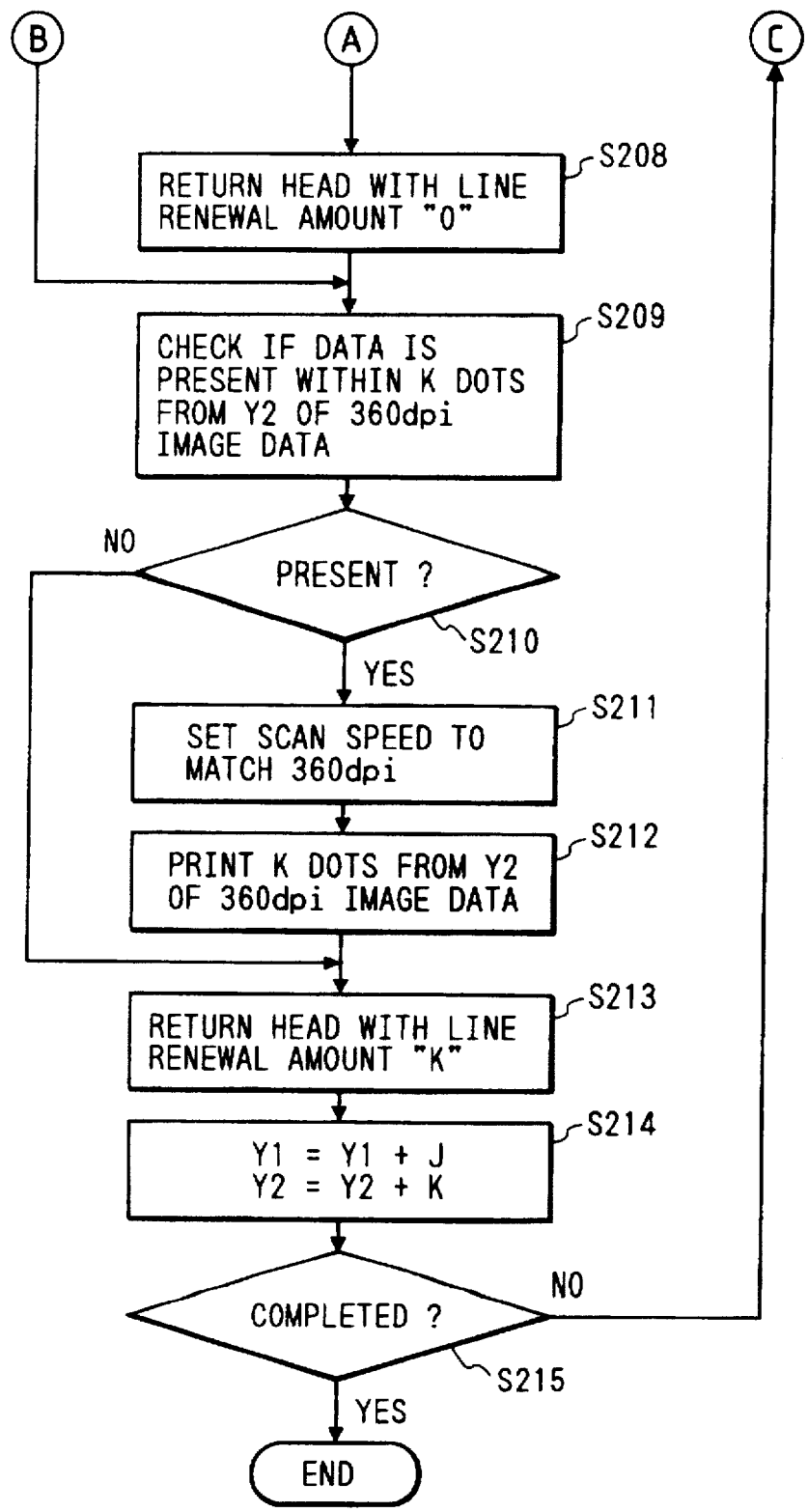
FIG. 25 and 25 (a) to 25 (b) are a flow chart showing processing for outputting image data having different resolutions to a printer in the third embodiment.
Figure 33B:
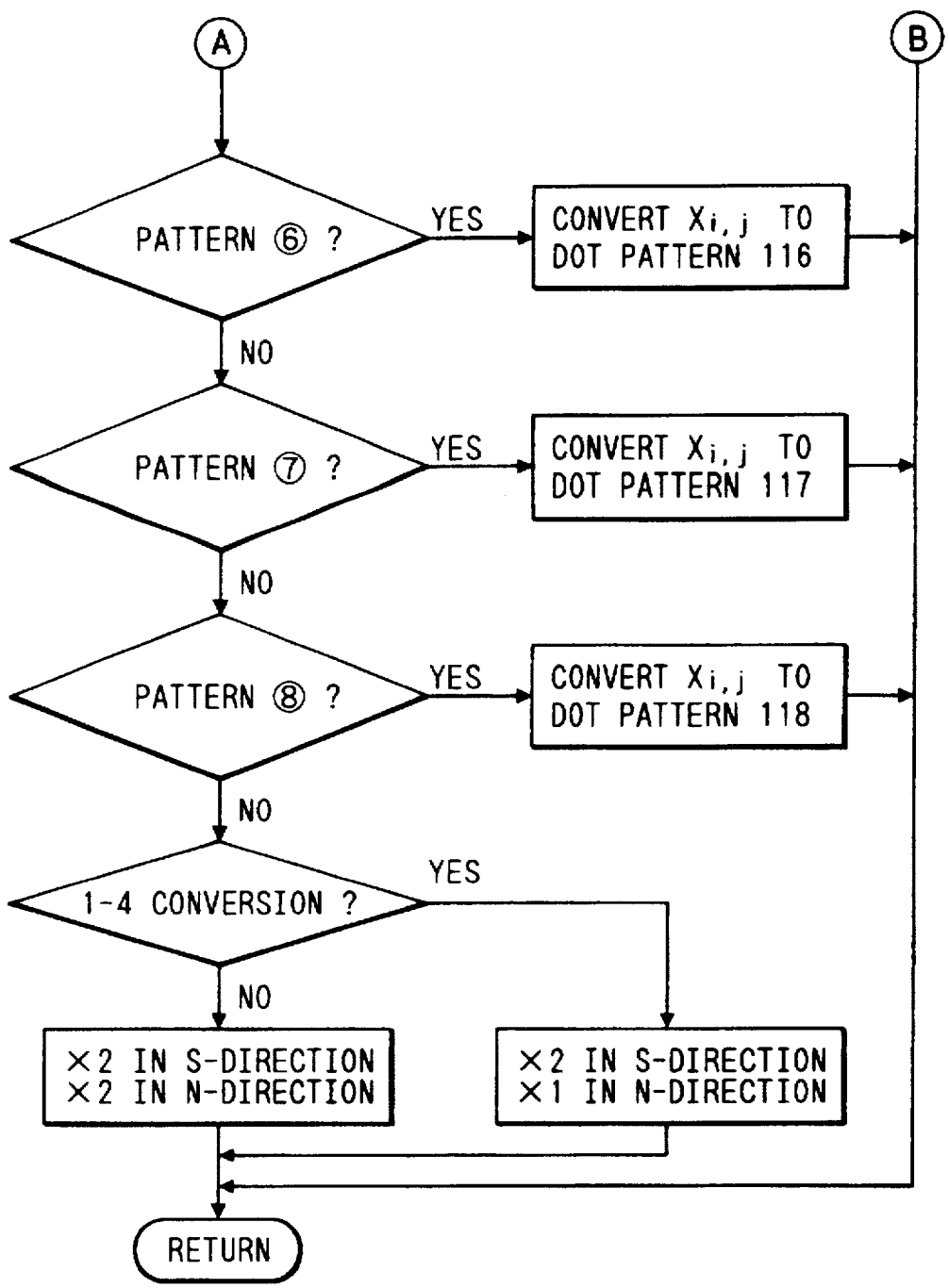
FIG. 33 and 33 (a) to 33 (b) are a flow chart showing density conversion processing in a correction unit shown in FIG. 32.

Line 43, "and 25 (a) to 25 (b) are" should read
--, consisting of Figs. 25(a) and 25(b), is--.
Line 65, "and 33 (a) to 33 (b) are" should read
--, consisting of Figs. 33(a) and 33(b), is--.

COLUMN 7

Line 43, "pitch a" should read --pitch a--.
Line 51, "an mount" should read --an amount--.

COLUMN 8

Line 21, "when-" should read --when--.

UNITED STATES PATENT AND TRADEMARK OFFICE
CERTIFICATE OF CORRECTION

PATENT NO. : 5,788,385
DATED : August 4, 1998
INVENTOR(S) : NAOSHI INOUE, ET AL.

It is certified that error appears in the above-identified patent and that said Letters Patent is hereby corrected as shown below:

<u>COLUMN 10</u>

Line 7, "hither" should read --higher--.
  Line 56, "of the" should read --on the--.

<u>COLUMN 12</u>

Line 53, "14*b*shows" should read --14b shows--.

<u>COLUMN 22</u>

Line 10, "positions" should read --position--.
  Line 12, "positions" should read --position--.

<u>COLUMN 23</u>

Line 4, "31awill" should read --31a will--.
  Line 50, "$X_{i-1j},$" should read --$X_{i-1,j}$, $X_{i,j}$,--.

Signed and Sealed this

Eighth Day of June, 1999

*Attest:*

Q. TODD DICKINSON

*Attesting Officer*      Acting Commissioner of Patents and Trademarks